United States Patent
Miyata et al.

[11] 3,879,525
[45] Apr. 22, 1975

[54] COMPOSITE METAL HYDROXIDES

[75] Inventors: Shigeo Miyata; Teruhiko Kumura; Minoru Shimada, all of Takamatsu, Japan

[73] Assignee: Kyowa Chemical Industry Co., Ltd., Tokyo, Japan

[22] Filed: Dec. 9, 1970

[21] Appl. No.: 96,430

[30] Foreign Application Priority Data
Dec. 12, 1969  Japan.............................. 44-99358

[52] U.S. Cl................ 423/277; 106/306; 423/311; 423/595; 423/326; 423/606; 423/365; 423/600; 423/415; 423/253; 423/469; 423/508; 423/518; 423/593; 252/62; 252/64; 252/301.1 R
[51] Int. Cl...................... C01b 35/00; C01g 49/00
[58] Field of Search........ 23/50, 315, 316, 343–346; 252/301.1; 423/277, 326, 518, 593

[56] References Cited
UNITED STATES PATENTS

| | | | |
|---|---|---|---|
| 2,797,978 | 7/1957 | Beekman ............................ | 23/50 R |
| 2,958,626 | 11/1960 | Schenck et al. .................. | 23/315 X |
| 3,099,524 | 7/1963 | Grossmith........................ | 23/315 |
| 3,347,640 | 10/1967 | Higuchi et al. ...................... | 23/315 |
| 3,347,641 | 10/1967 | Higuchi et al. ...................... | 23/315 |
| 3,539,306 | 11/1970 | Kumura et al. ...................... | 23/315 |
| 3,573,006 | 3/1971 | Shih et al. ............................ | 23/315 |

FOREIGN PATENTS OR APPLICATIONS
1,086,779   10/1967   United Kingdom

OTHER PUBLICATIONS

Hey, An Index of Mineral Species and Varieties, 2nd Ed., 1955, pp. 79, 81, 84, 275, 280.
Laitinen, Chemical Analysis, McGraw-Hill Book Co. Inc., 1960, pp. 160, 161.
Mahin, Quantitative Analysis, 3rd Ed., McGraw-Hill Book Co. Inc., 1924, pp. 19–20.
Gilman, A Dictionary of Chemical Equations, Electric Pub., 1958, pp. 198–201 & 276–281.

*Primary Examiner*—Carl D. Quarforth
*Assistant Examiner*—R. L. Tate
*Attorney, Agent, or Firm*—Sherman & Shalloway

[57] ABSTRACT

A composite metal hydroxide expressed by the following composition formula:

$$Mg_xM_y^{3+}(OH)_{2x+3y-2z}(A^{2-})_z \cdot aH_2O$$

wherein $M^{3+}$ is a trivalent metal selected from the group consisting of aluminum, iron and chromium; $A^{2-}$ stands for a divalent anion other than $CO_3^=$,
the composite metal hydroxide having a layer crystal structure and exhibiting an endothermic peak owing to isolation of crystal water at a temperature exceeding 170°C. in the differential thermal analysis.

2 Claims, 4 Drawing Figures

$Mg_xFe_y(OH)_{2x+3y-2z}(CrO_4)_z \cdot aH_2O$

COMPOSITE METAL HYDROXIDES

This invention relates to novel composite metal hydroxides having a layer crystal structure and to a process for the preparation of the same.

More detailedly, this invention relates to novel composite metal hydroxides having a layer crystal structure and being expressed by the following composition formula:

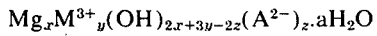

(1)

wherein $M^{3+}$ is a trivalent metal selected from the group consisting of aluminum, iron and chromium, $A^{2-}$ stands for a divalent inorganic anion selected from the group consisting of $S^=$, $Pt(CN)_4^=$, $CS_3^=$, oxyacid and metal halogenic acid radicals of an element selected from the group consisting of sulfur, selenium, tellurium, phosphorus, silicon, germanium, tin, boron, vanadium, chromium, molybdenum, tungsten, manganese, ruthenium, rhodium, osmium and uranium; and $xy$, $y$, $z$ and $a$ are positive numbers satisfying the requirements expressed by the following formulas:

$$\frac{1}{4} \leqq x/y \leqq 8,$$
$$1/6 < \frac{z}{x+y} > \frac{1}{2}$$

and $$0.25 \leqq \frac{a}{x+y} \leqq 1.0.$$

Compounds of the above-mentioned group of this invention have, in common, a layer crystal structure expressed substantially by the following X-ray diffraction pattern:

| d(A) | Relative Intensity (I/I$_o$) |
|---|---|
| 7.8 ± 3.2 | 100 |
| 3.9 ± 1.6 | 5 – 80 |
| 2.6 ± 1.2 | 5 – 60 |
| 1.53 ± 0.05 | 2 – 10 |
| 1.50 ± 0.05 | 2 – 10 |

The value of the relative intensity (I/I$_o$) varies depending on treatment conditions during manufacturing, particularly conditions of the hydrothermal treatment and pressurizing treatment.

A group of composite metal hydroxides having the above layer crystal structure has been named "Andromedite" (which will be adreviated as AM sometime hereinbelow).

As the composite metal hydroxide having the above layer crystal structure, hydrotalcite (composition formula = $Mg_6Al_2(OH)_{16}CO_3 \cdot 4H_2O$), pyroavrite (composition formula = $Mg_6Fe_2(OH)_{16}CO_3 \cdot 4H_2O$) and stichitite (composition formula = $Mg_6Cr_2(OH)_{16}CO_3 \cdot 4H O$), each of which is of natural source have been known.

They are produced only in very small amounts. Further, since they are extremely impure, it is difficult to recover them in a pure form. Accordingly, these natural minerals have not been heretofore used for industrial purposes.

It seems somewhat strange that in each of the known composite metal hydroxides of the Andromedite type the anion is a carbonic radical. This is deemed to be due to the specific property of the carbonic radical that is likely to form a layer crystal structure together with magnesium or a trivalent metal such as aluminum, iron and chromium.

It has been found that a group of novel composite metal hydroxides of the Andromedite type having an anion different from the anion contained in the above-mentioned known substance can be synthesized, as detailed hereinbelow, by reacting the magnesium component and the component of a trivalent metal such as aluminum, chromium and iron under specific conditions.

The primary object of this invention is to provide a group of novel composite metal hydroxides having a composition different from those of the above-mentioned natural minerals and having a stable layer crystal structure, and a process for the synthesis of these novel composite metal hydroxides.

Another object of this invention is to provide novel composite metal hydroxides having great utility in a broad application range as intermediates in the production of a magnetic body, an adsorbent, a dehydrating agent, a catalyst, an intermediate in the production of a catalyst, a pigment, etc.

This invention will be detailed hereinbelow.

Chemical Composition of Composite Metal Hydroxide

As the trivalent metal $M^{3+}$ in the above formula aluminum, chromium, iron and mixtures thereof may be cited.

Any divalent inorganic anion other than the carbonic radical may be used as $A^{2-}$. As such inorganic anions oxyacid radicals of sulfur, selenium, tellurium (Ie), phosphorus, silicon, germanium, tin, boron, indium, yttrium, gallium (Ga), scandium (Sc) chromium, molybdenum, tungsten, manganese, ruthenium (Ru), rhodium, osmium and uranium may be mentioned. Specific examples of such oxyacid radicals are $S_2O_3^=$, $SO_3^=$, $S_2O_6^=$, $SO_4^=$, $SeO_3^=$, $SeO_4^=$, $TeO_4^=$, $TeO_3^=$, $HPO_4^=$, $NH_4PO_4^=$, $SiO_3^=$, $B_4O_7^=$, $CrO_4^=$, $CrO_7^=$, $MoO_4^=$, $Mo_2O_7^=$, $SnO_3^=$, $MnO_4^=$, $UO_4^=$, and $UO_6^=$. Halogenic acid radicals of the above-mentioned metals such as $GeF_6^=$, $ZrF_6^=$, $SiF_6^=$, $SnF_6^=$, $TiF_6^=$, $PtBr_6^=$, and $SbF_5^=$; and $S^=$, $CS_3^=$ and $Pt(CN)_4^=$ are also applicable. Particularly preferable divalent inorganic ions are $CrO_4^=$, $Cr_2O_7^=$, $B_4C_7^=$, $MoO_4^=$, $SeO_3^=$, $SeO_4^=$, $SiO_3^=$, $SO_3^=$ and $SO_4^=$.

Composite metal hydroxides of above formula (I) can possess a layer crystal structure when $x$, $y$, $z$ and $a$ satisfy the requirements defined by the above-mentioned unequalities. In composite metal hydroxides of this invention, $x$, $y$, $z$ and $a$ stand most preferably for the following numbers:

x = 4–8, y = 2, z = 0.7–1.4 and a = 3–5

In this case the composite metal hydroxides are expressed by the following formula:

It has been found, however, that composite metal hydroxides can have a definite layer crystal structure if $x$, $y$, $z$ and $a$ are not such positive members but are numbers with certain ranges. Values of $x$ and $y$ may be varied broadly within the range satisfying the requirement of $1/4 \leqq x/y \leqq 8$, but in general a good crystal structure is attained within the range of $1.0 \leqq x/y \leqq 8$. It is particularly preferable that the values of $x$ and $y$ are within the range satisfying $2 \leq x/y \leq 5$.

Reference is made to the accompanying drawings for a better illustration of this invention.

Figure 3:
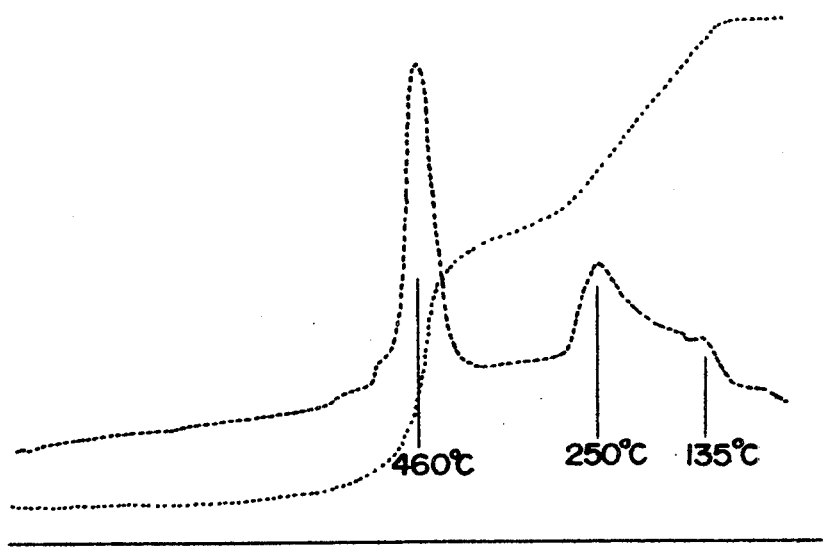

FIG. 3 sets forth differential thermal analysis and thermogravimetric analysis diagrams of $Mg_6Al_2(OH)_{16}(CrO_4) \cdot 4H_2O$.

Figure 4:
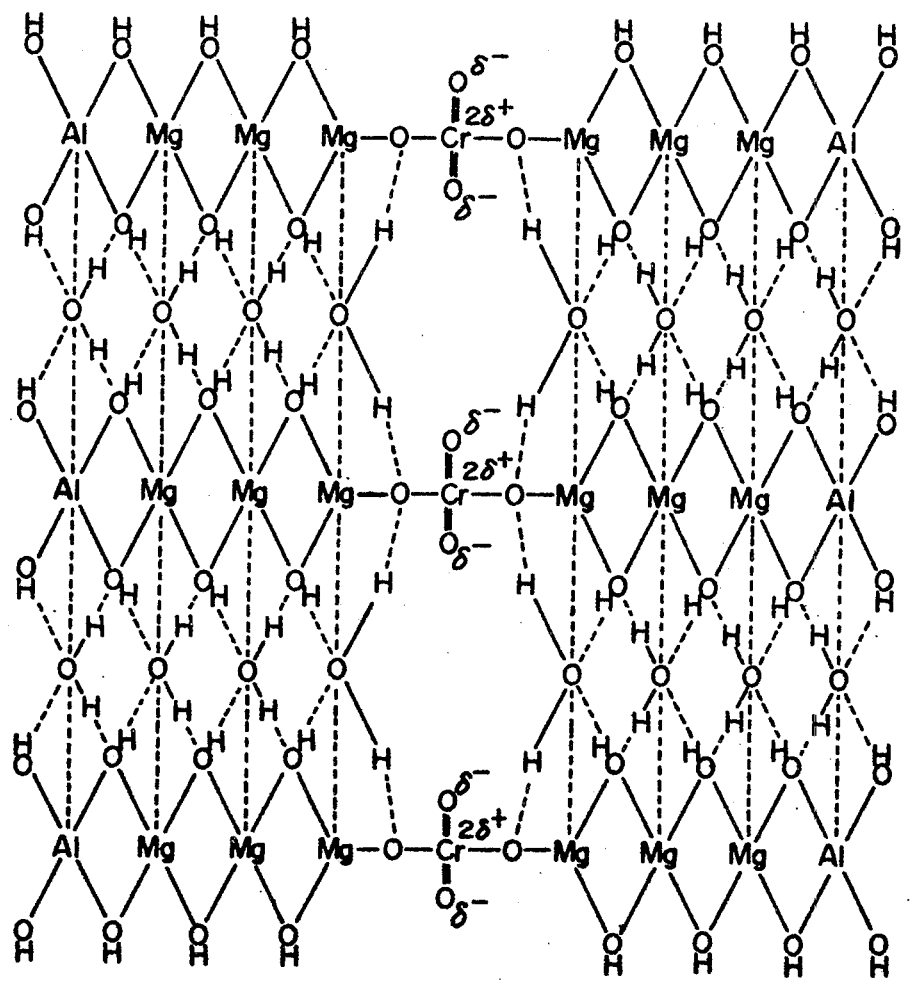

FIG. 4 is a diagram illustrating a presumed structure of $Mg_6Fe_2(OH)_{16}(CrO_4) \cdot 4H_2O$ according to this invention.

Figure 1:
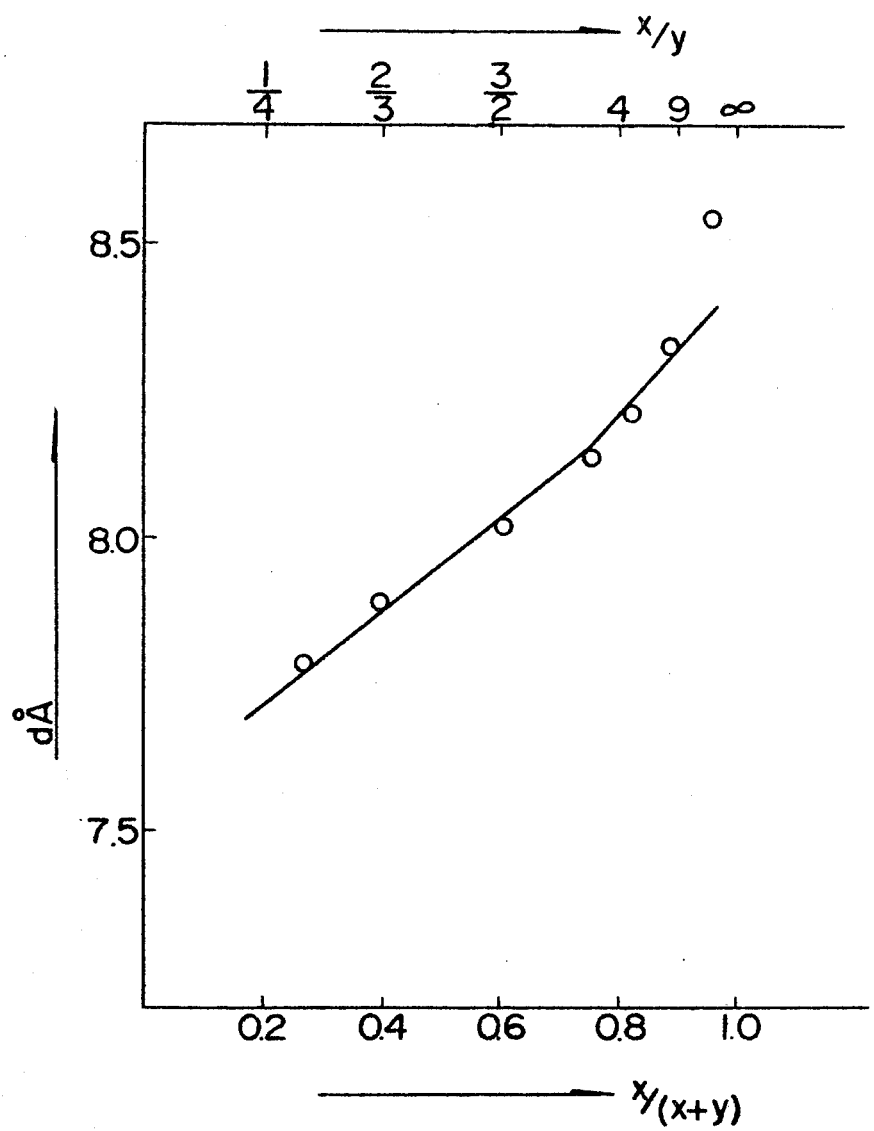
FIG. 1 is a diagram of $Mg_xAl_y(OH)_{2x+3y-2z}(CrO_4)_z \cdot aH_2O$ drawn based on Vegards' rule.

With reference to, for instance, $Mg_xAl_y(OH)_{2x+3y-2z}(CO_3)_z \cdot aH_2O$, the relation between the space distance $d(A)$ and the valve of $x/y$ is shown by the curve in FIG. 1. From this curve it is seen that the critical point of the composition resides at the point of $Mg/(M^{3+}+Mg) = x/(x+y) = 0.75$, and that when the value of Mg, i.e., $x$ becomes great beyond this point, the space distance becomes relatively large and when $M^{3+}$, i.e., $y$ becomes great beyond this point, the space distance $d$ becomes small. This tendency is one of the general properties of natural minerals forming a mixed crystal. Thus it is apparent that composite metal hydroxides of this invention form a crystal and in other cases they may form a mixed crystal. The determination of the space density $d$ was effected by X-ray diffraction on samples prepared by dropping $Mg^{2+}$, $M^{3+}$ and $A^{2-}$ each in aqueous medium, and NaOH aqueous solution from different burettes while controlling the pH to 9 - 12, filtering the reaction product suspension, and washing and drying the resulting precipitate.

From the above-mentioned facts it is concluded that crystal lattice points of $Mg^{2+}$ and $M^{3+}$ may be replaced by $M^{3+}$ and $Mg^{2+}$, respectively and that with respect to each of $Mg^{2+}$, $M^{3+}$ and $A^{2-}$, two or more ions may be introduced into one crystal lattice point. In general, formation of a mixed crystal is possible within a range of $1/4 \leq x/y \leq 8$.

As is seen from the data in Table 1, it is generally necessary that the requirement of $A^{2-}/(Mg^{2+}+M^{3+}) = z/(x+y) \geq 1/20$ be satisfied. Considering the crystallinity of products, it is allowable that the quantitative relation among $x$, $y$ and $z$ is within the range of $z/(x+y) \geq 1/200$ but it is particularly preferred that the requirement of $z/(x+y) \geq 1/20$ is statisfied. By X-ray diffraction it was confirmed that each of the samples shown in Table 1 was a composite metal hydroxide falling within the scope of this invention.

Table 1

| Sample No. | Chemical analysis values (molar ratio) | | | $A^{2-}/(Mg^{2+}+M^{3+}) = z/(x+y)$ | Crystallinity (relative value of peak height at (006) face) |
| --- | --- | --- | --- | --- | --- |
| | Mg | Al | SO₃ | | |
| 1 | 6.0 | 2 | 1 | 1/8 | 36.1 |
| 2 | 6.2 | 2 | 0.82 | 1/10 | 26.0 |
| 3 | 6.0 | 2 | 0.40 | 1/20 | 24.9 |
| 4 | 6.0 | 2 | 0.04 | 1/200 | 10.5 |
| 5 | 4.0 | 2 | 0.3 | 1/20 | 24.3 |
| 6 | 8.0 | 2 | 0.5 | 1/20 | 22.9 |

It is generally difficult to increase the value of $z/(x+y)$ over 1/6. In composite metal hydroxides of this invention it is particularly preferred that the inequality of $1/8 \geq z/(x+y) \geq 1/10$ be satisfied.

As is seen from the data in Table 2, within a range forming a mixed crystal, the value of $a/(x+y)$ is about one-half in most of the products. Even in products having a lower crystallinity the value is not smaller than 0.25 and in products having an anion of a larger radius within the range forming a mixed crystal the value is close to 1. Accordingly, it is essential that the condition of $0.25 \leq a/(x+y) \leq 1.0$ be satisfied. The amount of crystal water was determined by the thermogravimetric analysis, when data of Table 2 were obtained.

Table 2

| Sample No. | $Mg^{2+}$ $x$ | $M^{3+}$ $y$ | $A^{2-}$ | Crystal water $(a)$ | $a/(x+y)$ | $x/y$ |
| --- | --- | --- | --- | --- | --- | --- |
| 1 | Mg | 2Al | CrO₄ | 0.8 | 0.27 | 0.5 |
| 2 | 3.2Mg | 2Al | CrO₄ | 2.2 | 0.42 | 1.6 |
| 3 | 5Mg | 4Al | CrO₄ | 3.4 | 0.49 | 2.5 |
| 4 | 6Mg | 2Al | CrO₄ | 4 | 0.50 | 3 |
| 5 | 6.9Mg | 2Al | CrO₄ | 3.8 | 0.48 | 3.45 |
| 6 | 8.5Mg | 2Al | CrO₄ | 3.7 | 0.35 | 4.25 |
| 7 | 10Mg | 2Al | CrO₄ | 3.7 | 0.31 | 5 |
| 8 | 14Mg | 2Al | CrO₄ | 4.2 | 0.26 | 7 |
| 9 | 6Mg | 2Al | WO₄ | 5.5 | 0.69 | 3 |
| 10 | 6Mg | 2Al | B₄O₇ | 7.6 | 0.95 | 3 |

With reference to values of $x$, $y$, $z$ and $a$ of formula (I), individual values of $x$, $z$ and $a$ can be determined from the above-mentioned inequality formulas by giving a value of 2 to $y$ for convenience's sake.

Typical examples of such preferable composite metal hydroxides are composite metal hydroxides having a composition expressed by the formula

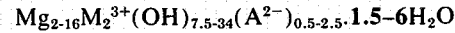

$$Mg_{2-16}M_2^{3+}(OH)_{7.5-34}(A^{2-})_{0.5-2.5} \cdot 1.5-6H_2O$$

where $M^{3+}$ is selected from aluminum, chromium and iron, and $A^{2-}$ is selected from $CrO_4^=$, $Cr_2O_7^=$, $MoO_4^=$, $SeO_4^=$, $SO_3^=$, $SO_4^=$, $SiO_3^=$, $S^=$ and $B_4O_7^=$.

Physical and Chemical Properties of Composite Metal Hydroxide

From results of X-ray diffraction analysis, differential thermal analysis, thermogravimetric analysis and infrared absorption spectrum analysis it is construed that novel composite metal hydroxides of this invention have a layer crystal structure in which crystal water is sandwiched in between layers and which is characterized by the lattice constant of $a_o = 3.1$ A and $C_o = 40$–70 A (varying depending on the kinds of metals and divalent anion). Data of X-ray diffraction (Cu-$K_a$) of $Mg_6Al_2(OH)_{16}CrO_4 \cdot 4H_2O$, which is a typical instance of the composite metal hydroxide of this invention, are shown in Table 3.

Table 3

| $d(A)$ | 2 | $I/I_o$ | hkl |
| --- | --- | --- | --- |
| 7.89 | 11.2 | 100 | 006 |
| 3.95 | 22.5 | 36 | 0012 |
| 2.60 | 34.5 | 27 | 024; 0.018 |
| 2.33 | 38.6 | 19 | |
| 1.53 | 60.4 | 10 | 220 |
| 1.51 | 61.5 | 10 | 226 |
| 1.99 | 45.6 | 8 | |

Figure 2:
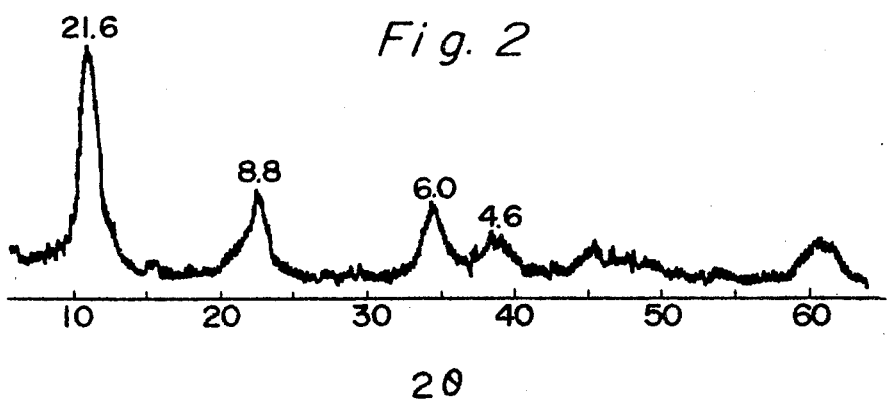
FIG. 2 is a X-ray diffraction diagram of $Mg_6Al_2(OH)_{16}(CrO_4) \cdot 4H_2O$.

As described above, the values of the space distance $d$ and relative intensity $I/I_o$ vary depending on the kinds of $M^{3+}$ and $A^{2-}$ and corresponding to crystallinity. Although the distance at (006) face varies within a range of = 3 – 4 A, it is possible to easily determined by the above-mentioned X-ray diffraction pattern whether a product falls within the scope of this invention or not. More specifically, the distance at each face of (006), (0012) and (0018) in above Table 3 varies within the above-mentioned range particularly depending on the kind of divalent anion, but changes in other space distances are very small. Accordingly, the determination can be easily made by comparing the pattern of the part where $d$ is not greater than 2.31 A and confirming the integral-multiplication change of $d$ corresponding to (006), (0012) and (0018) faces. For reference, the X-ray diffraction pattern of $Mg_6Al_2(OH)_{16}CrO_4 \cdot 4H_2O$ is shown in FIG. 2. Further, the determination can be performed based on data of differential thermal analysis (D.T.A.) and thermogravimetric analysis (T.G.A.). Results of differential thermal analysis and thermogravimetric analysis of $Mg_6Al_2(OH)_{16}CrO_4 \cdot 4H_2O$ are shown in FIG. 3. The measuring was conducted at a temperature elevating rate of 5°C/min in the air by using $\alpha$-$Al_2O_3$ as a standard substance.

These data vary depending on the kinds of $M^{3+}$ and $A^{2-}$, the crystallinity and the ratio of $x/y$.

As is seen from FIG. 3, the composite metal hydroxides of this invention exhibit an endothermic peak owing to isolation of crystal water at a temperature higher than 170°C., generally in the range of 200° to 350°C., in the differential thermal analysis. In other words, one of characteristics of novel composite metal hydroxides of this invention is that the isolation of crystal water is caused to occur at such high temperatures, e.g. exceeding 200°C.

If an explanation is made by referring to $Mg_6Al_2\cdot(OH)_{16}CrO_4 \cdot 4H_2O$ as an example, the composite metal hydroxides of this invention are construed to have a structure shown in FIG. 4, though this invention is not limited to that structure alone. More specifically, in the novel composite metal hydroxides of this invention, it is presumed that $Mg(OH)_2$ is polymerized by the 01 linkage to form an oligomer, such as a trimer, $M^{3+}(OH)_3$ is polymerized as a comonomer with the oligomer, and the divalent anion $A^{2-}$ is linked with the oligomer of $Mg(OH)_2$, whereby the skeleton of the layer structure is formed. Further, water is interposed between the so formed layers and layers are bonded to each other by the hydrogen bond and coordination bond.

It is allowable that a part of $Mg^{2+}$ is substituted by the trivalent metal $M^{3+}$, and it is naturally considered that the amount of crystal water sandwiched in between layers may be varied depending on the ion radius of the divalent anion $A^{2-}$.

The stable crystal structure of the novel substance of this invention will be apparent from the above.

Synthesis of Composite Metal Hydroxide

In accordance with this invention, a process is provided for the preparation of composite metal hydroxides having a layer crystal structure and being expressed by the following composition formula:

$$Mg_xM_y^{3+}(OH)_{2x+3y-2z}(A^{2-})_z \cdot aH_2O$$

wherein $M^{3+}$ is a trivalent metal selected from the group consisting of aluminum, iron and chromium; $A^{2-}$ stands for a divalent anion selected from the group consisting of $S^+$, $Pt(CN)_4^=$, $SC_3^=$, and oxyacid and metal halogenic acid radicals of an element from the group consisting of sulfur, selenium, tellurium, phosphorus, silicon, germanium, tin, boron, vanadium, chromium, molybdenum, tungsten, manganese, ruthenium, rhodium, osmium and uranium; and $x$, $y$, $z$ and $a$ are positive numbers satisfying the requirements expressed by the following formulas:

$$\frac{1}{4} \leq x/y \leq 8,$$
$$1/6 > \frac{z}{x+y} > 1/20$$

and $$0.25 \leq \frac{a}{x+y} \leq 1.0,$$

such process comprising reacting (1) $x$ moles of magnesium hydroxide or a compound capable of forming magnesium hydroxide under the reaction conditions and (2) $y$ moles of a hydroxide of the trivalent metal $M^{3+}$ or a compound capable of forming the hydroxide under the reaction conditions in the presence of at least $z$ moles of the divalent ion $A^{2-}$ and water and in the substantial absence of carbonic ions at a pH exceeding 7 and a temperature ranging from 0° to 350°C. under such conditions that the requirement expressed by the formula:

$$pS_1 - pS_2 > -1$$

wherein $pS_1$ stands for the stability constant of $Mg(OH)_2$ and $pS_2$ stands for the stability constant of $MgA^{2-}$, is satisfied.

In the aqueous or water-containing organic solvent medium containing $Mg^{2+}$, $M^{3+}$, $A^{2-}$ and $OH^-$, the following two reactions must be considered:

$$Mg^{2+} + 2OH^- \rightarrow Mg^{2+}(OH)_2 \quad (I)$$

$$Mg^{2+} + A^{2-} \rightarrow Mg^{2+}A^{2-} \quad (II)$$

When the reaction of formula (II) occurs predominantly over the reaction of formula (I), the first condition for arriving at the structure of the product of this invention is not satisfied. Accordingly, it is necessary that the reaction conditions must be maintained such that the reaction of formula (I) occurs preferentially. These reaction conditions are determined by the difference of the stability constant between the hydroxide $Mg^{2+}(OH)_2$ and the metal salt $Mg^{2+}A^{2-}$. The stability constant is defined as follows:

Stability products (S) of $Mg^{2+}(OH)_2$ and $Mg^{2+}A^{2-}$ are expressed as follows:

$[Mg^{2+}][OH^-] = S_1$
$[Mg^{2+}][A^{2-}] = S_2$

The stability is expressed in terms of the reciprocal of the solubility product, i.e., the dissociation constant. Thus the stability constant (K) is shown as follows:

$$K_1 = \frac{[Mg^{2+}(CH^-)2]}{[Mg^{2+}][^{OH-}]^2} = \frac{1}{S_1}$$
$$K_2 = \frac{[Mg^{2+}\,A^{2-}]}{[Mg^{2+}][A^{2-}]} = \frac{1}{S_2}$$

When the above stability constants are expressed logarithmically, the following formulas are derived:

$$logK_1 = -logS_1 = pS_1$$

$logK_2 = -logS_2 = pS_2$
The reaction conditions can be determined based on these stability constants $pS_1$ and $pS_2$.

In order to cause preferential occurrence of formation of $Mg^{2+}(OH)_2$, it is necessary to conduct the reaction at a pH precipitating a desired amount of the hydroxide. Values of such pH can be calculated based on the teachings of various references.

As described above, the reaction conditions are determined based on the differences of the stability constant between $Mg^{2+}(OH)_2$ and $Mg^{2+}A^{2-}$. For instance, when the amount of $OH^-$ fed is almost equivalent to $Mg^{2+}$ and $M^{3+}$, the following three cases result:

(1) $pS_1 - pS_2 \geq 1$;

In this case, the reaction of formula (1) advances preferentially, and all of the reaction product is the intended product and no by-product MgA is formed.

(2) $1 > pS_1 = pS_2 > -1$

In this case, the intended product is also formed as in (1) above but the crystallinity is relatively low.

(3) $pS_1 - pS_2 \leq -1$

In this case, a small amount of $M^{2+}A^{2-}$ is formed and the intended hydroxide is obtained only in an impure form.

In order to prevent the formation of $M^{2+}A^{2-}$ in the case of (2) it is advantageous to conduct the reaction in the presence of $OH^-$ in an amount from about 2 to about 80 times as large as the amount required for precipitating $Mg^{2+}$ as hydroxide under the condition of $z/(x+y) \leq 1/8$. The competitive nature of the reactions of formulas (I) and (II) can be contemplated from $pS_1 - pS_2 = K$. Accordingly, optimum conditions for forming and manufacturing the intended AM products can be determined. These conditions are shown in Table 4.

Table 4

| Value of K | CH⁻ feed to $(Mg^{2+} + M^{3+})$ | $A^{2-}$ feed | Desired temperature (°C) | Continuous Process OH⁻ feed to $(Mg^{2+} + M^{3+})$ optimum for attaining high crystallinity | Yield of AM product (%) |
|---|---|---|---|---|---|
| $K \geq 1$ | almost equivalent | $z/(x+y)$ 1/20 | below about 100 | almost equivalent | 100 |
| $1 > K \geq -1$ | almost equivalent | 1/20 $z/(x+y)$ 1/8 | below about 60 | 5 – 10 equivalent | about 100 |
| $-1 > K$ | more than equivalent | 1/20 $z/(x+y)$ 1/8 | below about 30 | 10 – 40 equivalent | more than 80 |

Note:
Under the condition of $-1 > K$ formation of the Am product is apparently observed, but in view of the yield and from the economical view point, it is preferred that the reaction is conducted under the condition of $K \geq -1$.

The results of reactions which were conducted under such conditions by employing equivalent amounts of the metal salt and alkali are shown in Table 5.

Table 5

| Reaction system | $pS_1$ | $pS_2$ | $pS_1-pS_2$ | Final reaction product (typical form) |
|---|---|---|---|---|
| $Mg^{2+}, SO_4^{2-}, Fe^{3+}$ | 10.7 | −0.7 | 11.4 | $Mg_6Fe_2(OH)_{16}SO_4 \cdot 4H_2O$ |
| $Mg^{2+}, MoO_4^{2-}, Fe^{3+}$ | 10.7 | 0.1 | 10.6 | $Mg_6Fe_2(OH)_{16}MoO_4 \cdot 4H_2O$ |
| $Mg^{2+}, SO_3^{2-}, Cr^{3+}$ | 10.7 | 2.4 | 8.3 | $Mg_6Cr_2(OH)_{16}SO_3 \cdot 4H_2O$ |
| $Mg^{2+}, HPO_4^{2-}, Fe^{3+}$ | 10.7 | 4.2 | 6.5 | $Mg_6Fe_2(OH)_{16}HPO_4 \cdot 4H_2O$ |
| $Mg^{2+}, GeO_3^{2-}, Fe^{3+}$ | 10.7 | 6.0 | 4.7 | $Mg_6Fe_2(OH)_{16}GeO_3 \cdot 4H_2O$ |
| $Mg^{2+}, NH_4PO_4^{2-}, Fe^{3+}$ | 10.7 | 12.5 | −1.8 | $Mg_6Fe_2(OH)_{16}(NH_4PO_4) \cdot 4H_2O + MgNH_4PO_4$ (trace) |

As the starting compound of magnesium magnesium hydroxides and compounds capable of forming magnesium hydroxide under the reaction conditions can be employed. Typical examples of such compounds are water-soluble inorganic salts of magnesium such as mineral acid salts, e.g., nitrate, halides and sulfate; carboxylates of magnesium such as acetate; and alkoxides of magnesium. As the starting compound of the trivalent metal $M^{3+}$, hydroxides of the trivalent metal $M^{3+}$ and compounds capable of forming the hydroxides under the reaction conditions may be used. As in the case of magnesium, as such compounds mineral acid salts of the trivalent metal $M^{3+}$ such as nitrates, halides and sulfates; carboxylates of the trivalent metal $M^{3+}$ such as acetates; and alkoxides of the trivalent metal $M^{3+}$ can be exemplified. It is also possible to use double salts of hydroxides of trivalent metal $M^{3+}$.

In accordance with the process of this invention, the above-mentioned starting compounds of magnesium and the above-mentioned starting compounds of the trivalent metal are reacted in the presence of water in the presence of at least z moles of the divalent anion $A^{2-}$ and in the substantial absence of carbonic ions at a pH exceeding 7.5.

In general, the reaction is conducted in water, but it is possible to conduct the reaction by using as the reaction medium a mixture of water and an organic solvent, for instance, a water-miscible organic solvent such as lower alcohols. The reaction is carried out at temperatures ranging from 0 to 350°C., preferably from 0° to 100°C.

When starting compounds of magnesium and/or the trivalent metal $M^{3+}$ are salts of the divalent anion $A^{2-}$, it is possible to omit addition of the divalent inorganic anion $A^{2-}$. Further, it is possible to add the divalent inorganic anion $2^-$ in the form of an acid or salt, particularly an alkali metal salt, to the reaction system.

The adjustment of the pH may be performed by adding to the reaction system caustic alkali and ammonium hydroxide. In this invention, it is generally preferred that the pH is adjusted within the range of from 9 to 12, though the preferable range of the pH varies to some extent depending on the kind of trivalent metal $M^{3+}$.

In order to shut off carbon dioxide gas from the reaction system, it is preferable to conduct the reaction in an inert gas such as nitrogen gas and decarbonated air or a reducing atmosphere such as hydrogen. It is desired that similar care is taken during filtering, washing and drying steps after the reaction so as to prevent incorporation of carbonic ions completely. It is particularly preferable to incorporate $A^{2-}$ and $OH^-$ slightly in excess into the reaction system while preventing incorporation of $CO_3^{2-}$ from the air.

In AM products of this invention, $M^{3+}(OH)_3$ is interlocked in the crystal structure in the form of the monomer or oligomer. It is construed that the polymer end of $[Mg(OH)_2]_n$ is made structurally stable by such monomer or oligomer and that two $M^{3+}(OH)_3$ groups in neighbouring layers may form a hydrogen bond via crystal water, whereby the layer structure is fixed very tightly and stably. The following case must be considered:

Since hydroxides of such trivalent metals as Fe and Cr are easily highly polymerized and the resulting high polymers are stable, these hydroxides are not appreciably present in the form of a monomer or oligomer, or they are not dissociated.

In order to solve the above problem, solutions of $Mg^{2+}$, $M^{3+}$ and $A^{2-}$ are contacted with one another continuously while maintaining a highly alkaline condition such as a pH exceeding 13, or it is possible to conduct the reaction at a pH of 6 – 9. By such procedures, the high polymerization of $M^{3+}(OH)_3$ can be prevented. The above problem can also be solved by adding to the reaction system a polyhydric alcohol such as glycerin, mannitol and sorbitol.

When the reaction is carried out while increasing the pH by adding $OH^-$ and $A^{2-}$ dropwise to an aqueous solution of $Mg^{2+}$ and $M^{3+}$, the precipitation is occurs at a pH of about 1.5 in the case of $Cr(OH)_3$, and the polymerization advances most highly at a pH ranging from 10 to 11. Accordingly, in such case, it is advantageous to use, in combination, a divalent metal hydroxide which requires completing the reaction at a pH ranging from 10 to 11.

It is particularly advantageous to conduct the process of this invention by the continuous operation procedures. In this case, aqueous or water-containing alcoholic solutions of $Mg^{2+}$, $M^{3+}$, $A^{2-}$ and $OH^-$ are prepared separately and used. It is also possible to use a combination of a mixed solution of $Mg^{2+}$ and $M^{3+}$ with a solution of $A^{2-}$ and a solution of $OH^-$ or with a mixed solution of $A^{2-}$ and $OH^-$.

In the case of a solution of an easily hydrolyzable metal component such as $Fe^{3+}$ and $Cr^{3+}$, it is preferred to adjust the pH of the solution to less than 1 by addition of HCl, $HNO_3$ or $H_2SO_4$.

In supplying these solutions continuously to the reaction vessel, the solutions are introduced to the reaction vessel provided with a stirrer and a temperature controlling device of high accuracy at such feed rates that the abovementioned conditions concerning x and y will be satisfied. As the pH of the reaction liquor greatly influences the quality of the product, it is preferred to control the pH change with a range of ±0.5, particularly ±0.1. Each solution may be supplied through a conduit or sprayed from the top of the reaction vessel. The reaction is terminated when the amount of reaction mixture arrives at a certain level, and the reaction mixture is withdrawn from the reaction vessel. If desired, the agitation is conducted at a desired temperature for a certain period of time before the withdrawal of the reaction mixture. The recovered reaction mixture is subjected to the solid-liquid separation. The solid is washed with water and is dried at a temperature not causing isolation of crystal water, preferably under reduced pressure. It is particularly advantageous to keep the amount of reaction mixture constant by means of an overflow device mounted on the reaction vessel. In order to keep a homogeneous state in the reaction vessel, it is advantageous to mount pH meters on the upper and lower portions of the reaction vessel and select the reaction conditions so that both pH meters indicate the same value.

As the reaction apparatus, a tube recycle system connected with a centrifugal pump may be used. In this case, each solution is fed quantitatively to the suction side of the pump and the pH value is measured just after the extrusion side of the pump to adjust it to a desired value. The amount of the reaction liquor circulated, the reaction temperature, the concentrations of starting compounds and the like are suitably arranged, and the reaction mixture in an amount corresponding to the amount of the starting solutions fed overflows. The above process is advantageous in that the space of the reaction apparatus can be smaller and the reaction liquor can be agitated vigorously in a small capacity. It is possible to use, instead of a centrifugal pump, an agitator to be used mainly for the pipe system or other liquid transmitting device. It is preferred that the starting solutions are fed in such amounts that the conditions of $x/y = 1-8$, especially 2-4, and $z/(x+y) = 1-1/8$ are satisfied.

The process of this invention may also be conducted batchwise. In this case, various operation procedures such as described below may be adopted.

1. In the same manner as in the continuous process, a mixed solution of $Mg^{2+}$ and $M^{3+}$ in the form of water-soluble metal salts or organic compounds soluble in organic solvents is charged in a reaction vessel, and a solution of $A^{2-}$, and $OH^-$ (i.e., alkali solution) in an amount almost equivalent to the sum of $Mg^{2+}$ and $M^{3+}$ are added while stirring. The resulting suspension is post-treated in the same manner as in the continuous process.
2. A solution of $OH^-$ is added to a solution of $Mg^{2+}$ to convert $Mg^{2+}$ almost completely to $Mg(OH)_2$, or both solutions are added to the reaction vessel while maintaining the pH above the level converting $Mg^{2+}$ almost completely to $Mg(OH)_2$. The resulting suspension of magnesium hydroxide is blended with solutions of $M^{3+}$, $A^{2-}$ and $OH^-$ under agitation.

3. A solution of OH⁻ is added to an inorganic acid-acidified solution of compounds of $Mg^{2+}$, and $A^{2-}$ under stirring.
4. A solution of OH⁻ is added to a solution of $Mg^{2+}$ and $A^{2-}$, or both solutions are continuously blended while maintaining the pH at a prescribed level. To the resulting mixed liquor a solution of $M^{3+}$ and a solution of OH⁻ are added.
5. $Mg(OH)_2$, $M^{3+}(OH)_3$ and $A^{2-}$ are dissolved in an aqueous medium at elevated temperatures, and a solution of OH⁻ is added to the resulting solution and the reaction is conducted preferably for 0.5 – 10 hours.
6. When starting compounds other than water-soluble metal salts and metal hydroxides are used, the pH and temperature are so selected that these starting compounds may be converted by hydroxides in an aqueous or organic solvent medium, and then the reaction is carried out in the same manner as in (5) above.

In these operations it is possible to add $Mg^{2+}$ and $M^{3+}$ to a solution of OH⁻ and $A^{2-}$.

The continuous process will now be compared with the batchwise process by referring to some instances. The pH is elevated from about 1 to values indicated in Table 6, while gradually adding a solution of $CrO_4^{2-}$ and OH⁻ dropwise to an aqueous solution of $Mg^{2+}$ and $Fe^{3+}$ in the batchwise procedure. The results are shown in Table 6 where results of the continuous procedure are also shown. In this case, the resulting product is $Mg_4Fe_2(OH)_{12}CrO_4 \cdot 3H_2O$.

Table 6

| pH of reaction system | Crystallinity of product | |
|---|---|---|
| | Batchwise reaction | Continuous reaction |
| 8.5 | 0.8 | 1.4 |
| 9 | 1.4 | 5.6 |
| 10 | 4.1 | 14.1 |
| 11 | 4.1 | 13.9 |
| 12 | 1.5 | 11.2 |
| 13 | 2.4 | 10.0 |

As is seen from the above results, the crystallinity varies depending on the reaction type and reaction conditions, and at the same pH the continuous process gives better crystallinity than the batchwise process. In the continuous process, the crystallinity and properties of the product vary depending on the pH, and it is observed that difference in the color tone or the activity against acid is brought about by the change of the pH. By way of example, the relation between the crystallinity and the acid value after the adsorption treatment observed when $Mg_6Al_2(OH)_{16}SO_4 \cdot 4H_2O$ prepared while varying the pH is used as an adsorbent, is shown in Table 7. The acid value after the adsorption treatment is determined in the following manner:

0.5 g of the product is added to 100 ml of dipropylene glycol ether (acid value = 0.5) containing dissolved therein acetic acid in an amount corresponding to 500 mg/liter of KOH, and the mixture is allowed to stand at 50°C. for 3 hours. The filtrate is titrated with alcoholic KOH by using phenol phthalene as an indicator to determine the remaining amount of acetic acid. The acid value is expressed in terms of milligrams of KOH required for neutralizing 1 ml of the filtrate.

Table 7

| pH | Crystallinity | Acid value after adsorption treatment |
|---|---|---|
| 8.5 | 7 | 0.3 |
| 9.5 | 34 | 0.1 |
| 10 | 37 | 0.05 |
| 11 | 37 | 0.05 |
| 13 | 33 | 0.1 |
| 10 (batchwise) (process) | 15 | 0.2 |

Synthesis of Composite Metal Hydroxide by Ion Exchange

In accordance with this invention, a process is provided for the preparation of composite metal hydroxides having a layer crystal structure and being expressed by the following composition formula:

$$Mg_x^{2+}M_y^{3+}(OH)_{2x+3y-2z}(A^{2-})_z \cdot aH_2O$$

wherein $M^{3+}$ is a trivalent metal selected from the group consisting of aluminum, iron and chromium; $A^{2-}$ stands for a divalent chromium; selected from the group consisting of $S^=$, $Pt(CN)_4^=$, $CS_3^=$, and oxyacid and metal halogenic acid radicals of an element selected from the group consisting of sulfur, selenium, tellurium, phosphorus, silicon, germanium, tin, boron, vanadium, chromium, molybdenum, tungsten, manganese, ruthenium, rhodium, osmium and uranium; and $x$, $y$, $z$ and $a$ are positive numbers satisfying the requirements by the following formulas:

$$\tfrac{1}{4} \leq x/y \leq 8,$$

$$1/6 > \frac{z}{x+y} > 1/20$$

and $$0.25 \leq \frac{a}{x+y} \leq 1.0,$$

such process comprising contacting a composite metal hydroxide expressed by the composition formula:

$$Mg_xM_y^{3+}(OH)_{2x+3y-2z}(E^{2-})_z \cdot aH_2O$$

wherein $M^{3+}$, $x$, $y$, $z$ and $a$ are as defined above, and $E^{2-}$ stands for a divalent inorganic anion other than $A^{2-}$, with an aqueous solution containing an excess of a salt expressed by the formula $Q^1Q^2A^{2-}$ wherein $A^{2-}$ is as defined above, $Q^1$ is selected from alkali metals and ammonium, and $Q^2$ is selected from a hydrogen atom, alkali metals and ammonium.

It has been found that in composite metal hydroxides of the Andromedite type the divalent inorganic anion contained therein can be easily substituted by other divalent inorganic anions. The anion exchange can be easily performed by contacting an aqueous solution containing the divalent inorganic anion to be introduced, in the form of, for instance, a sodium potassium or ammonium salt, with the starting composite metal hydroxide containing a divalent inorganic anion different from the divalent inorganic anion to be introduced. When the solution of the divalent inorganic anion to be introduced is too acidic, there is a tendency that the starting composite metal hydroxide is dissolved therein.

Accordingly, it is preferred that the contact is conducted under an alkaline condition, especially at a pH exceeding 8. In view of the treatment time, it is preferred that the concentration of the divalent inorganic ion in the solution to be used is at least 0.02 mole per liter. The contact may be effected at room temperature sufficiently, but when the contact is conducted at an elevated temperature ranging from 40° to 90°C., the time required for the contact can be generally shortened. In accordance with this embodiment, a composite metal hydroxide of the Andromedite type is first formed by using a divalent anion having a high value of $K = pS_1 - pS_2$, and then a desired anion may be introduced thereinto by anion exchange. This is the prominent advantages of this invention. It is preferred that the anion exchange is conducted by the column method, but the solution method may also be adopted. By way of example, results of the ion exchange of $Mg_6Fe_2(OH)_{16}CO_3 \cdot 4H_2O$ with various anions are shown in Table 8.

Table 8

| Anion added | $CO_2$ content (%) | X-ray intensity peak height on (0.06) face (relative value) |
| --- | --- | --- |
| — | 6.7 | 12.8 |
| $CrO_4^{2-}$ | 0.08 | 12.6 |
| $SO_4^{2-}$ | 1.97 | 9.9 |
| $SO_3^{2-}$ | 0.04 | 15.2 |
| $SeO_4^{2-}$ | 0.20 | 12.0 |
| $B_4O_7^{2-}$ | 2.71 | 11.7 |
| $TeO_3^{2-}$ | 0.62 | 10.6 |

Post-Treatments

The product obtained in accordance with the process of this invention is then subjected to hydrothermal treatment and heat aging treatment. The formation of crystals or growth of crystals is promoted, for instance, by treating an aqueous suspension of the product of this invention or a reaction suspension containing the product of this invention in an autoclave maintained at 100°–350°C. under elevated pressure below 300 atmospheres for 0.5 hours — several days, generally 20 – 50 hours. The heat aging treatment is performed by conducting the heating in a similar manner under atmospheric pressure. Although the heat aging treatment cannot increase the crystallinity as well as the hydrothermal treatment, this can be carried out simply without using any specific treatment device.

After such treatments, the product-containing suspension is cooled and filtered. The recovered product is washed and dried according to need. The post-treatments as well as the reaction may be conducted in an inert gas atmosphere so as to prevent oxidation. Additives such as polymerization inhibitors may be used during post-treatment.

By way of example, the change of the crystallinity by the post-treatment of the reaction suspension obtained in the preparation of $Mg_{10}Al_2(OH)_{23}3/2SO_3 \cdot 6H_2O$ and having the intended product concentration of 150 grams per liter, is shown in Table 9. The crystallinity is expressed in terms of a relative value of the reciprocal number of the half width at (006) face.

Table 9

| Temperature (°C.) | Pressure (atmosphere) | Time (hours) | Crystallinity (relative value) |
| --- | --- | --- | --- |
| — | — | — | 21.7 |
| 100 | 1 | 1 | 23.0 |
| 100 | 1 | 3 | 24.7 |
| 100 | 1 | 5 | 25.9 |
| 100 | 1 | 10 | 27.0 |
| 100 | 1 | 15 | 31.2 |
| 150 (hydrothermal treatment) | 5 | 15 | 35.3 |

Use

In composite metal hydroxides of this invention 2 or more elements are optionally combined in the crystal structure. Accordingly, this invention can provide products meeting various demands. For instance, the composite metal hydroxides of this invention are useful as intermediates in the production of magnetic substances, adsorbents, dehydrating agents, divalent anion exchangers, catalyst, intermediates in the production of catalysts, medicines such as antacids and astringents, excipients and pigmentary cosmetics. The utility of the products of this invention will now be described.

As a method for preparing ferrite, a low temperature homogenous calcining method utilizing the co-precipitation technique is excellent, but this method involves problems concerning filtration and impurities and has various defects such as non-uniform growth of crystals. On the other hand, since the product of this invention is obtained by the solution reaction conducted at room temperature under atmospheric pressure, it has a structure that can be suitably converted to a highly magnetic spinel structure, $Mg^{2+}M_2^{3+}O_4$. Accordingly, the product of this invention is an excellent precursor leading to a highly magnetic substance of a spinel structure. For instance, the product of this invention is converted in a manner shown below by heating at relatively low temperatures:

$$Mg^{2+}M_y^{3+}(OH)_{2x+3y-2z}SO_3 \cdot aH_2O$$
$$\rightarrow Mo + Mg^{2+} M_2^{3+}O_4 + H_2O + SO_2\uparrow + 1/2O_2\uparrow$$

(wherein MO stands for an oxide for $Mg^{2+}$ or $M^{3+}$)

Main properties of magnetic substances are determined during the reaction stage. Accordingly, the product of this invention is very advantageous, because the reaction controls can be easily conducted in this invention. Further, the product of this invention is excellent in filter-ability when compared with conventional hydroxides and is also excellent in that impurities, particularly alkali metals, are not appreciably incorporated in the product of this invention.

As the product of this invention is a solid which is either basic or acidic, it can be utilized for adsorption of both acidic and basic substances. In the product of this invention, the elution of metals is much lower and the adsorption efficiency is much higher than in the conventional adsorbents. Further, the adsorption efficiency and selectively can be optionally changed by changing the kinds and composition ratios of metals.

For instance, the Mg-Al composite hydroxide has an amphoteric property as a solid acid and solid base, and when the ratio of Mg and Al is changed, the property of either acid or base is increased. Further, the adsorbent property may be changed by varying the kind of anion. Even if crystal water interposed between layers once been isolated once in the product of this invention, when water is given thereto, crystal water is formed again in the orginal position of the crystal structure. In other words, the product of this invention has a substantially complete adsorbent capacity and possess characteristics of a solid acid, solid base and dehydrating agent coincidentally in one crystal structure. Accordingly, the product of this invention is an adsorbent of great utility which can adsorb an acid, an alkali and water at the same time.

In order to confirm the reversibility of crystal water, T.G.A. measurement was conducted on sample (A) obtained by drying $Mg_6Al_2(OH)_{16}CrO_4 \cdot 4H_2O$, at 105°C. for 3 hours, sample (B) obtained by calcining sample sample (A) at 300°C. for 1 hour and sample (C) obtained by suspending sample (B) in water and drying the same. The results are as follows:

|  | Crystal water content (calculated value=10.9%) |
| --- | --- |
| Sample (A) | 10.7% |
| Sample (B) | 0.0% |
| Sample (C) | 10.8% |

The results of X-ray diffraction measurement are as follows:

|  | X-ray diffraction intensity (diffraction peak height at (006) face) |
| --- | --- |
| Sample (A) | 37.6 |
| Sample (A) | 8.3 |
| Sample (C) | 37.2 |

As shown above, the product of this invention has a reversibility in adsorption and isolation of crystal water, and it is therefore utilized as a dehydrating agent. Accordingly, the product of this invention can separate water from an azeotropic mixture of water and an alcohol, the separation of which is impossible by distillation. The product of this invention can absorb hydrogen as well, but it does not appreciably absorb alcohols such as ethanol, methanol and ethylene glycol, and acetone.

In the product of this invention, the anion can be easily replaced by other divalent anions. Accordingly, the product of this invention can be used as an ion exchanger.

In view of the composition of the product of this invention, its use as a catalyst is expected. Further, it is sometimes useful as an intermediate leading to a catalyst. In the case of catalysts prepared by the co-precipitation method, it is considered that each atom is easily coagulated and the atom arrangement is of poor regularity. Accordingly, the distribution of catalytic points is irregular and the catalytic activity is not uniform. Further, as coagulation of atoms is present in such catalyst, there is a fear that it is easily deactivated. On the other hand, as the precipitate of the product of this invention has a crystal structure, coagulation of atoms is difficulty caused to occur and all the atoms are arranged regularly with little disorder. When measured according to X-ray diffraction analysis or from a microscopic photograph, the layer of the crystal structure of the product of this invention is usually found to have a thickness of less than 100 A. Accordingly, it is construed that in the product of this invention crystal layers grow very thinly. Therefore, when the product of this invention is calcined at temperatures within a certain range, it takes a particulate form in which each atom is in the amorphous state. Thus, the activity is uniform and selective, and there a catalyst can be obtained which is hardly degraded by catalyst poison. Further, activities as a solid base and solid acid and specific oxidation and reduction activities can be obtained by suitably selecting a combination of metals and an anion. For instance, products obtained by calcining the composite metal hydroxides of this invention at about 550° to about 700°C. are catalysts useful for oxidation of olefins, ammoxidation of olefins, alkylation of aromatic compounds, cracking of petroleum hydrocarbons and the like.

It is another interesting feature of the composite metal hydroxides of this invention that the stability against heat may be varied within a range of about 100°C. by changing the kind of anion. Accordingly, it is possible to optionally change the maximum activity temperature. Decomposition temperatures of some examples of the product of this invention are shown in Table 10.

Table 10

| Kind of product | Decomposition temperature (°C.) (according to D.T.A. analysis) |
| --- | --- |
| $Zn_4Al_2(OH)_{12}SO_3 \cdot 3H_2O$ | 260 |
| $Zn_4Al_2(OH)_{12}Cr_2O_7 \cdot 3H_2O$ | 320 |
| $Zn_4Al_2(OH)_{12}CrO_4 \cdot 3H_2O$ | 290 |
| $Zn_4Al_2(OH)_{12}S_2O_3 \cdot 3.5H_2O$ | 300 |
| $Zn_4Al_2(OH)_{12}S_2O_7 \cdot 5H_2O$ | 290 |
| $Zn_4Al_2(OH)_{12}SiO_3 \cdot 4H_2O$ | 245 |
| $Zn_4Al_2(OH)_{12}B_4O_7 \cdot 6H_2O$ | 300 |

As the product of this invention can contain metals such as aluminum, magnesium and iron, it is useful as a medicine. For instance, Mg-Fe type composite hydroxides are promising as an indicator for roentgenoscoy, being superior to $BaSO_4$. Further, the composite metal hydroxides of this invention are characterized in that incorporation of a monovalent cation such as $Na^+$ or $K^+$ is extremely small.

In the product of this invention, thin layer crystals are agglomerated in the petal-like or plane plate-like form. Accordingly, when pressure is imposed on the product of this invention, particles are easily combined with one another by bonding ability between layers. Because of this property, the product of this invention is useful as an excipient excellent in tablet-forming property. The hardness of the $Mg-Al-SO_4$ type product at various compression pressures is measured by a strong cobb hardness meter and is compared with those of conventional excipients. Results are shown in Table 11.

Table 11

| Compression pressure (kg/cm²) | Product of this invention | Alumina gel hydroxide | Crystallized lactose | Crystallized cellulose |
| --- | --- | --- | --- | --- |
| 318 | 15.2 | 2.4 | 0 | 12.3 |
| 636 | <25 | 6.0 | 0 | 19.8 |
| 955 | '' | 11.2 | 0.9 | <25 |
| 1274 | '' | 16.8 | 1.8 | '' |
| 1911 | '' | >25 | 2.8 | '' |
| 2548 | '' | >25 | 5.8 | '' |

The product of this invention can also be used as a pigment. Since the coloring substance can be dispersed in the state of atoms, the color tone may be varied in a broad range, and a low preparation cost is another advantage. Further, when $CrO_4$, Fe or the like is combined in the crystal structure, these components exhibit a certain refractive index (about 1.5) and form fine particles. Accordingly, such product can be used a transparent or semi-transparent pigment by adding it to resins or other materials to be colored. Still further, the product of this invention has a smooth touch and a good luster, and it is useful as a luster-imparting agent and a sizing agent for paper-manufacturing. As the product of this invention has a layer crystal structure, it exhibits a lustrous oily feeling and is uniform in particle size. Still further, the product of this invention has extremely excellent wether-ability, and particularly at room temperature or temperatures below 100°C. it is highly resistant against water and has a suitable moisture-absorbing property. Still further, it exhibits a good affinity or capatibility with organic substances. Accordingly, it is useful as a substrate of a paste-like or powdery cosmetic.

EXAMPLE 1

10.8 g of ferric chloride ($FeCl_3.6H_2O$) were dissolved in 100 ml of a magnesium chloride solution of a concentration of 1.2 moles per liter calculated as MgO, and the pH of the resulting liquor was adjusted to 1 by concentrated hydrochloric acid.

The so formed hydrochloric acid-acidified liquor, together with 26 ml of a $Na_2SO_4$ solution of a concentration of 0.2 mole per liter and a caustic soda solution of a concentration of 2.0 moles per liter, was added at room temperature under agitation in a $N_2$ gas current dropwise to a 500-ml capacity breaker charged with 80 ml of water. During the addition, the amount of caustic soda fed solution was controlled so that the pH of the reaction liquor was maintained above 13. After completion of the reaction, water was removed from the resulting suspension by means of a vacuum pump, and the precipitate was washed with 200 ml of ion-exchange water and dried at 80°C. for 10 hours in a $N_2$ gas current.

X-ray diffraction analysis results, chemical analysis values and the composition formula derived therefrom of the product are as follows:

Composition formula
$Mg_6Fe_2(OH)_{16}SO_4.4H_2O$
$K = 11.4$
$x/y = 3$
$z/(x+y) = 1/8$ X-ray diffraction

| $d(A)$ | 8.20 | 4.11 | 2.62 | 1.54 |
|---|---|---|---|---|
| $I/I_o$ | 100 | 35 | 20 | 15 |

Chemical analysis

| MgO | 33.9% | (5.99) |
|---|---|---|
| $Fe_2O_3$ | 22.4% | (1.0) |
| $SO_4$ | 13.4% | (1.00) |
| $H_2O$ | 30.3% | (12.00) |

Notes:
(1) Analysis values were measured according to fluorescent X-ray analysis method, chelate titrating method and ordinary chemical analysis method.
(2) Parenthesized values in "Chemical Analysis" indicate molar ratios.
(3) $d(A)$ stands for the space distance determined by X-ray diffraction and $I/I_o$ stands for the intensity ratio expressed in the relative value based on the peak heights measured by the X-ray diffraction method.
These matters will apply similarly to subsequent examples.

EXAMPLE 2

In 200 ml of decarbonated water 16.0 g of $Cr(NO_3)_3.9H_2O$ and 24.4 g of $MgCl_2.6H_2O$ were dissolved, and the pH of the solution was adjusted to 1 by addition of concentrated nitric acid so as to prevent the hydrolysis of chromium nitrate. Separately, 2.9 g of $Na_2SO_4$ were dissolved in 100 ml of water. Both solutions, together with an aqueous solution containing 4 moles per liter of NaOH, were added in a $N_2$ gas current dropwise to a 500-ml capacity breaker charged with 100 ml of water. The addition of the NaOH aqueous solution was adjusted so that the pH of the reaction suspension was maintained above 13.5. After completion of the reaction, the reaction suspension was transferred to an autoclave and subjected to hydrothermal treatment of 150°C. for 15 hours. Then it was allowed to cool to room temperature, and post-treatments were conducted in the same manner as in Example 1. Results of the analysis of the product are as follows:

Composition formula
$Mg_6Cr_2(OH)_{16}SO_4.4H_2O$
$K = 11.4$
$x/y = 3$
$z/(x+y) = 1/8$ X-ray diffraction

| $d(A)$ | 8.15 | 4.09 | 2.63 | 1.55 |
|---|---|---|---|---|
| $I/I_o$ | 100 | 50 | 80 | 50 |

Chemical analysis

| MgO | 34.2% | (6.08) |
|---|---|---|
| $Cr_2O_3$ | 21.2% | (1.0) |
| $SO_4$ | 14.1% | (1.05) |
| $H_2O$ | 30.6% | (12.20) |

EXAMPLE 3

In a solution containing 0.25 mole per liter of $AlCl_3.6H_2O$ $MgCl_2.6H_2O$, $MgSO_4.7H_2O$ and $Mg(NO_3)_2.6H_2O$ were dissolved so that the Mg salt concentration was 0.75 mole per liter calculated as MgO. The so formed liquor, an aqueous solution of $K_2CrO_4$ of a concentration of 0.75 mole per liter and an aqueous solution of NaOH of a concentration of 4.8 moles per liter were fed to a 2,100-ml capacity synthetic resin reaction vessel of a 100 mm diameter from the top and at feed rates of 28.8 ml/min, 36.0 ml/min and 12 ml/min, respectively. The reaction vessel had been charged with 500 ml of water in advance. The reaction vessel was kept in a thermostat tank so that the temperature was maintained at 60° ± 20°C. The reaction vessel was equipped with an overflow device, and the reaction liquor was agitated at 830 r.p.m. by a constant rate stirrer. A pH electrode connecting a pH indicator was inserted in the reaction vessel. The reaction was conducted for 6 hours while the pH of the reaction liquor which was maintained at 10.5 – 11.0. The liquor overflowed in 1 hour from the initiation of the reaction was thrown away, and the suspension which overflowed after that time was collected and water was removed therefrom under reduced pressure. The residue was washed with water and dried at 80°C. for 10 hours. Results of the analysis of the product are as follows:

Composition formula
$Mg_6Al_2(OH)_{16}CrO_4.4H_2O$
$K = 11.5$
$x/y = 3$
$z/(x+y) = 1/8$ -Continued Composition formula X-ray diffraction

| d(A) | 7.62 | 3.81 | 2.60 | 2.33 | 1.53 | 1.54 |
|---|---|---|---|---|---|---|
| I/I$_o$ | 100 | 43 | 30 | 22 | 9 | 6 |

Chemical analysis

| MgO | 35.7% | (5.98) |
|---|---|---|
| Al$_2$O$_3$ | 15.1% | (1.0) |
| CrO$_4$ | 17.2% | (1.00) |
| H$_2$O | 32.0% | (12.00) |

EXAMPLE 4

24.4 g of MgCl$_2$.6H$_2$O and 15.0 g of Al$_2$(NO$_3$)$_3$.9H$_2$O were dissolved in 200 ml of water. The so formed liquor and a liquor of 18.5g of K$_2$M.O$_4$ and 13.0 g of NaOH dissolved in 200 ml of water were added dropwise to a beaker charged with 60 ml of water. The pH of the reaction suspension was maintained at 10.0 – 11.0 and the temperature was adjusted to 25° – 30°C. The resulting suspension was heated at 70°C. for 5 hours, and the water was removed therefrom under reduced pressure. The residue was dried at 70°C. for 12 hours after washing with 200 ml of water. The reaction and post-treatment were conducted in a N$_2$ gas current. Results of the analysis of the product are as follows:

Composition formula
   Mg$_6$Al$_2$(OH)$_{16}$MoO$_4$.4H$_2$O    K = 10.6
                                                             $s/y = 3$
                                                             $z/(x+y) = 1/8$ X-ray diffraction

| d(A) | 9.30 | 4.90 | 2.63 | 1.52 |
|---|---|---|---|---|
| I/I$_o$ | 100 | 70 | 20 | 50 |

Chemical analysis

| MgO | 33.8% | (6.04) |
|---|---|---|
| Al$_2$O$_3$ | 14.2% | (1.0) |
| MoO$_4$ | 22.2% | (1.00) |
| H$_2$O | 30.0% | (11.90) |

EXAMPLE 5

The following four solutions, namely (1) an aqueous solution of Mg(NO$_3$)$_2$.6H$_2$O of a concentration of 0.6 mole/liter calculated as MgO, (2) an aqueous solution of Cr(NO$_3$)$_3$.9H$_2$O of a concentration of 0.2 mole/liter calculated as Cr$_2$O$_3$, the pH of which had been adjusted to 1 by hydrochloric acid so as to prevent hydrolysis, (3) an aqueous solution of K$_2$HPO$_4$ of a concentration of 0.1 mole/liter and (4) an aqueous solution of NaOH of a concentration of 2.0 moles/liter, were fed to a reaction tank at rates of 20 ml/min, 20 ml/min, 20 ml/min and 18 ml/min, respectively, by means of controllable pumps. The reaction tank was a 2,000-ml capacity cylindrical reactor equipped with a constant rate stirrer, which was charged with 500 ml of water in advance. With a view to adjusting the pH of the reaction liquor to a range of 8 – 9 where the development of polymerization of trivalent chromium hydroxide is low, the pH was maintained at 8.5 ± 0.1 by adjusting the feed of the caustic soda solution. The reaction was conducted under agitation by the constant rate stirrer. The reaction suspension which overflowed in 90 minutes from the initiation of the reaction was thrown away, and the suspension which overflowed after that time was collected and subjected to the hydrothermal treatment at 150°C. for 5 hours in an autoclave and water was removed therefrom under reduced pressure. The residue was washed with 250 ml of water and dried at 70°C. for 15 hours. Results of the analysis of the product are as follows:

Composition formula
   Mg$_6$Cr$_2$(OH)$_{16}$HPO$_4$.4H$_2$O    K = 6.5
                                                             $x/y = 3$
                                                             $z/(x+y) = 1/8$ X-ray diffraction

| d(A) | 7.96 | 3.95 | 2.56 | 1.51 |
|---|---|---|---|---|
| I/I$_o$ | 100 | 35 | 25 | 20 |

Chemical analysis

| MgO | 34.6% | (6.16) |
|---|---|---|
| Cr$_2$O$_3$ | 21.2% | (1.0) |
| HPO$_4$ | 13.5% | (1.01) |
| H$_2$O | 30.7% | (12.20) |

EXAMPLE 6

In 100 ml of a solution of magnesium chloride of a concentration of 1.2 moles/per liter calculated as MgO, 16.0 g of Cr(NO$_3$)$_3$.9H$_2$O were dissolved, and the pH of the solution was adjusted to 1 by concentrated hydrochloric acid. The so formed liquor was added dropwise at room temperature under agitation to a 500-ml capacity beaker charged with 80 ml of water, together with 25.6 ml of a K$_2$MoO$_4$ solution of a concentration of 0.2 mole/liter and a caustic soda solution of a concentration of 2.0 moles/liter. The pH of the reaction liquor was maintained above 13 by adjusting the addition of the caustic soda solution. After completion of the reaction, water was removed from the resulting suspension under reduced pressure, and the remaining solid was washed with water and dried. Results of the analysis of the product are as follows:

Composition formula
   Mg$_6$Cr$_2$(OH)$_{16}$MoO$_4$.4H$_2$O    K = 10.6
                                                           $x/y = 3$
                                                            $z/(x+y) = 1/8$ X-ray diffraction

| d(A) | 8.93 | 4.48 | 2.64 | 1.53 |
|---|---|---|---|---|
| I/I$_o$ | 100 | 40 | 40 | 35 |

Chemical analysis

| MgO | 31.4% | (6.00) |
|---|---|---|
| Cr$_2$O$_3$ | 19.8% | (1.00) |
| MoO$_4$ | 20.8% | (1.00) |
| H$_2$O | 28.1% | (12.00) |

EXAMPLE 7

An aqueous solution containing 0.288 mole per liter of FeCl$_3$.6H$_2$O calculated as Fe$_2$O$_3$, the pH of which was maintained at 1 by addition of concentrated hydrochloric acid so as to prevent hydrolysis, and an aqueous solution containing 0.864 mole per liter of MgCl$_2$.6H$_2$O calculated as MgO were sprayed uniformly on the surface of the reaction liquor from the upper portion of a reaction tank via 500 holes of 0.3 mm diameter of a sprayer composed of a synthetic resin. The feed rate of each solution was 11.3 ml/min. The reaction tank was a 2-liter capacity cylindrical reactor and the temperature inside the reactor was maintained at 30° ± 1°C. The reaction system was agitated at a constant rate by a propeller stirrer. The agitation direction of the stirrer was the upward direction. From the bottom of the reactor an aqueous solution containing 0.144 mole per liter of Na$_2$CrO$_4$ and another aqueous solution containing 3.56 moles per liter of NaOH were fed at feed rates of 22.6 ml/min, and 14.6 ml/min, respectively, through a pipe so disposed that both aqueous solutions were fed from the central portion of the bottom of the reactor. The amount of NaOH fed was so adjusted that a pH electrode would always indicate a value between 12.5 and 12.9 When the pH value became stable and the concentration of the reaction liquor was constant, the reaction suspension which overflowed was collected. The residence time of the reaction liquor in the reactor was about 35 minutes. The resulting suspension was heated at 70°C. for 5 hours and cooled. Post-treatments were conducted in the same manner as in Example 1. Results of the analysis of the product are as follows:

Composition formula
$Mg_6Fe_2(OH)_{16}CrO_4.4H_2O$    $K = 11.5$
$x/y = 3$
$z/(x+y) = 1/8$ X-ray diffraction

| $d(A)$ | 7.89 | 3.93 | 2.61 | 2.31 | 1.53 |
|---|---|---|---|---|---|
| $I/I_o$ | 100 | 33 | 28 | 11 | 8 |

Chemical analysis

| MgO | 32.8% | (6.13) |
|---|---|---|
| $Fe_2O_3$ | 21.2% | (1.0) |
| $CrO_4$ | 17.0% | (1.10) |
| $H_2O$ | 29.0% | (12.10) |

EXAMPLE 8

24.4 g of $MgCl_2.6H_2O$ and 15.0 g of $Al(NO_3)_3.9H_2O$ were dissolved in 200 ml of water. The so formed liquor and a liquor of 6.9 g of $K_2SO_4$ dissolved in 100 ml of water were added dropwise to a beaker charged with 100 ml of water, while the pH of the reaction suspension was maintained at 9.5 – 10.5 by a NaOH solution of a concentration of 2.0 moles per liter and the reaction temperature was adjusted to 20° – 30°C. After completion of the reaction, the resulting suspension was subjected to the water-removing treatment under reduced pressure, and the residue was washed with 200 ml of water and dried at 70°C. for 12 hours. All of the above operations were conducted in air decarbonated by passing a concentrated NaOH aqueous solution. Results of the analysis of the product are as follows:

Composition formula
$Mg_6Al_2(OH)_{16}SO_4.4H_2O$    $K = 11.4$
$x/y = 3$
$z/(x+y) = 1/8$ X-ray diffraction

| $d(A)$ | 8.18 | 4.06 | 2.59 | 1.52 |
|---|---|---|---|---|
| $I/I_o$ | 100 | 35 | 17 | 17 |

Chemical analysis

| MgO | 36.9 % | (6.00) |
|---|---|---|
| $Al_2O_3$ | 15.5 % | (1.0) |
| $SO_4$ | 14.6 % | (1.00) |
| $H_2O$ | 33.0 % | (12.00) |

EXAMPLE 9

A liquor of 24.4 g of $MgCl_2.6H_2O$ and 15.0 g of $Al(NO_3)_3.9H_2O$ dissolved in 200 ml of water and a liquor of 8.8 g of $K_2SeO_4$ dissolved in 100 ml of water were added dropwise under agitation to a beaker charged with 100 ml of water. By addition of a NaOH solution of a concentration of 2.0 moles per liter, the pH of the reaction liquor was maintained at 10.0 – 11.0. The reaction temperature was adjusted to 20° – 30°C. The resulting suspension was heated to 90°C. for 3 hours and treated in the same manner as in Example 4. Results of the analysis of the product are as follows:

Composition formula
$Mg_6Al_2(OH)_{16}SeO_4.4H_2O$    $K = 5.8$
$x/y = 3$
$z/(x+y) = 1/8$ X-ray diffraction

| $d(A)$ | 8.18 | 4.09 | 2.60 | 1.53 |
|---|---|---|---|---|
| $I/I_o$ | 100 | 40 | 18 | 23 |

Chemical analysis

| MgO | 34.2 % | (5.96) |
|---|---|---|
| $Al_2O_3$ | 14.5 % | (1.0) |
| $SeO_4$ | 20.3 % | (1.00) |
| $H_2O$ | 30.7 % | (12.00) |

EXAMPLE 10

In 200 ml of water 21.6 g of $FeCl_3.6H_2O$ were dissolved and 24.4 g of $MgCl_2.6H_2O$, and the pH of the solution was adjusted to 1 by addition of concentrated hydrochloric acid so as to prevent the hydrolysis of ferric chloride. Separately, 6.9 g of $K_2SiO_3$ were dissolved into 100 ml of water. Both liquors were added dropwise to a 500-ml capacity flask at room temperature under agitation together with an aqueous solution containing 2.0 moles per liter of NaOH while the pH of the mixture was maintained above 12.5. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows:

Composition formula
$Mg_6Fe_2(OH)_{16}S_2O_3.4H_2O$    $K = 11.5$
$x/y = 3$
$z/(x+y) = 1/8$ X-ray diffraction

| $d(A)$ | 8.11 | 3.95 | 2.64 | 1.54 |
|---|---|---|---|---|
| $I/I_o$ | 100 | 28 | 15 | 11 |

Chemical analysis

| MgO | 33.9 % | (5.99) |
|---|---|---|
| $Fe_2O_3$ | 22.4 % | (1.0) |
| $S_2O_3$ | 15.7 % | (1.00) |
| $H_2O$ | 30.1 % | (11.95) |

EXAMPLE 11

In 200 ml of water 21.6 g of $FeCl_3.6H_2O$ were dissolved, and 24.4 g of $MgCl_2.6H_2O$, and the pH of the solution was adjusted to 1 by addition of concentrated hydrochloric acid so as to prevent the hydrolysis of ferric chloride. Separately, 6.8 g of $K_2SO_3$ were dissolved into 100 ml of water. Both liquors were added dropwise to a 500-ml capacity flask at room temperature under agitation together with an aqueous solution containing 2.0 moles per liter of NaOH while the pH of the mixture was maintained above 12.5. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows:

| Composition formula | | | | | |
|---|---|---|---|---|---|
| $Mg_6Fe_2(OH)_{16}SO_3\cdot 4H_2O$ | | | K = 8.3 | | |
| | | | x/y = 3 | | |
| | | | z/(x+y) = 1/8 | | |
| X-ray diffraction | | | | | |
| d(A) | 7.82 | 3.86 | 2.60 | 2.31 | 1.52 |
| I/I₀ | 100 | 28 | 15 | 11 | 8 |
| Chemical analysis | | | | | |
| MgO | 35.5 % | | (6.01) | | |
| Fe₂O₃ | 23.4 % | | (1.0) | | |
| SO₃ | 11.7 % | | (1.00) | | |
| H₂O | 31.5 % | | (11.93) | | |

EXAMPLE 12

In 200 ml of water 21.6 g of FeCl₃·6H₂O were dissolved and 24.4 g of MgCl₂·6H₂O, and the pH of the solution was adjusted to 1 by addition of concentrated hydrochloric acid so as to prevent the hydrolysis of ferric chloride. Separately, 8.3 g of Na₂S₂O₆ were dissolved into 100 ml of water. Both liquors were added dropwise to a 500-ml capacity flask at room temperature under agitation together with an aqueous solution containing 2.0 moles per liter of NaOH while the pH of the mixture was maintained above 13.0. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows:

| Composition formula | | | | |
|---|---|---|---|---|
| $Mg_6Fe_2(OH)_{16}S_2O_6\cdot 4H_2O$ | | | K = 11.7 | |
| | | | x/y = 3 | |
| | | | z/(x+y) = 1/8 | |
| X-ray diffraction | | | | |
| d(A) | 8.04 | 3.93 | 2.64 | 2.31 |
| I/I₀ | 100 | 28 | 15 | 11 |
| Chemical analysis | | | | |
| MgO | 31.8 % | | (5.99) | |
| Fe₂O₃ | 13.0 % | | (1.0) | |
| S₂O₆ | 21.0 % | | (1.00) | |
| H₂O | 28.2 % | | (11.99) | |

EXAMPLE 13

An aqueous solution containing 0.20 mole per liter of Al₂(SO₄)₃·18H₂O and 1.20 moles per liter of Mg(NO₃)₂·6H₂O, an aqueous solution containing 2.0 moles per liter of NaOH were fed to the same reactor as used in Example 7 at feed rates of 20 ml/min, 20 ml/min and about 16 ml/min, respectively. The reaction was conducted at 40° ± 1°C. while maintaining the pH of the reaction liquor at 11.0° ± 0.1. The liquor which overflowed in 30 minutes from the initiation of the reaction and the liquor which overflowed after that time were collected separately. It was found that crystals were developed in the latter liquor much more than in the former liquor.

The reaction was continued for 1 hour, and the latter reaction suspension was filtered under reduced pressure, and to the residue a Na₂SO₃ aqueous solution of a concentration of 0.1 mole per liter was poured, under reduced pressure of about 500 mmHg to effect the ion-exchange. The ion-exchange was continued until a yellow effluent was not observed. The product was nearly white, the same being then dried at 80°C. optionally after washing with a small amount of water. Results of the analysis of the product are as follows:

| Composition formula | | | | | |
|---|---|---|---|---|---|
| $Mg_6Al_2(OH)_{16}SO_3\cdot 4H_2O$ | | | K = 8.3 | | |
| | | | x/y = 3 | | |
| | | | z/(x+y) = 1/8 | | |
| X-ray diffraction | | | | | |
| d(A) | 7.89 | 3.94 | 2.60 | 2.37 | 1.55 | 1.52 |
| I/I₀ | 100 | 44 | 36 | 30 | 15 | 15 |
| Chemical analysis | | | | | |
| MgO | 38.8 % | | (6.02) | | |
| Al₂O₃ | 16.3 % | | (1.0) | | |
| SO₃ | 12.6 % | | (0.98) | | |
| H₂O | 34.5 % | | (11.94) | | |
| CrO₄ | 0.08 % | | ( — ) | | |

EXAMPLE 14

An aqueous solution containing 0.20 mole per liter of Al(NO₃)₃·9H₂O calculated as Al₂O₃ and 0.60 mole per liter of Mg(NO₃)₂·6H₂O calculated as MgO, an aqueous solution containing 0.05 mole per liter of Na₂SO₄ and 0.05 mole per liter of Na₂CrO₄, and an aqueous solution containing 2.0 moles per liter of NaOH were fed to a 1.8-liter capacity reactor equipped with an overflow device, at feed rates of 30 ml/min, 30 ml/min and about 24 ml/min, respectively. The reactor had been charged with 500 ml of water in advance. The pH of the reaction liquor was maintained at 10.5 ± 1 and the temperature was maintained at 50° ± 1°C. The reaction was conducted for 1 hour. The suspension which overflowed was filtered and the recovered solid was washed with water and dried at 80°C. for 10 hours. Results of the analysis of the product are as follows:

| Composition formula | | | | | |
|---|---|---|---|---|---|
| $Mg_6Al_2(OH)_{16}(SO_4)_{0.5}(CrO_4)_{0.5}\cdot 4H_2O$ | | | | | |
| | | | K = 11.4 (Mg-SO₄ series) | | |
| | | | K = 11.5 (Mg-CrO₄ series) | | |
| | | | x/y = 3, z/(x+y) = 1/8 | | |
| X-ray diffraction | | | | | |
| d(A) | 7.84 | 3.95 | 2.64 | 2.33 | 1.52 | 1.50 |
| I/I₀ | 100 | 40 | 32 | 20 | 12 | 13 |
| Chemical analysis | | | | | |
| MgO | 37.2 % | | (5.99) | | |
| Al₂O₃ | 15.7 % | | (1.0) | | |
| SO₄ | 7.4 % | | (0.50) | | |
| CrO₄ | 8.9 % | | (0.50) | | |
| H₂O | 32.2 % | | (11.69) | | |

EXAMPLE 15

In 100 ml of a solution of magnesium chloride of a concentration of 1.2 moles/per liter calculated as MgO, 16 g of Cr(NO₃)₃·9H₂O were dissolved, and the pH of the solution was adjusted to 1 by concentrated hydrochloric acid. The so prepared solution acidified by hydrochloric acid was added dropwise at room temperature under agitation to a 500-ml capacity beaker charged with 80 ml of water, together with 25.6 ml of a K₂SeO₄ solution of a concentration of 0.2 mole/liter and a caustic soda solution of a concentration of 2.0 mole/liter. The pH of the resulting liquor was maintained above 13 by adjusting the addition of the caustic soda solution. After completion of the reaction, water was removed from the resulting suspension under reduced pressure, and the remaining solid was washed with water and dried. Results of the anaylsis of the product are as follows:

Composition formula
$Mg_6Cr_2(OH)_{16}SeO_4\cdot 4H_2O$    $K = 5.8$
   $x/y = 3$
   $z/(x+y) = 1/8$ X-ray diffraction

| $d(A)$ | 8.11 | 4.02 | 2.59 | 1.53 |
|---|---|---|---|---|
| $I/I_o$ | 100 | 40 | 25 | 25 |

Chemical analysis

| MgO | 32.8% | (6.00) |
|---|---|---|
| $Cr_2O_3$ | 20.6 % | (1.0) |
| $SeO_4$ | 19.0 % | (0.99) |
| $H_2O$ | 29.5 % | (12.11) |

EXAMPLE 16

24.4 g of $MgCl_2\cdot 6H_2O$ and 15.0 g of $Al(NO_3)_3\cdot 9H_2O$ were dissolved in 200 ml of water. The so formed liquor and a solution of 8.3 g of $Na_2S_2O_6$ dissolved in 100 ml of water were added dropwise to a beaker charged with 100 ml of water, together with an aqueous solution containing 2.0 moles per liter of NaOH, in a manner such that the pH of the reaction liquor was maintained at 9.0 – 10.0. The resulting suspension was dehydrated under reduced pressure, and the residue was washed with 200 ml of water and dried at 80°C. for 12 hours. Results of the analysis of the product are as follows:

Chemical composition
$Mg_6Al_2(OH)_{16}S_2O_6\cdot 4H_2O$    $K = 11.2$
   $x/y = 3$
   $z/(x+y) = 1/8$ X-ray diffraction

| $d(A)$ | 8.04 | 4.05 | 2.58 | 1.53 | 1.50 |
|---|---|---|---|---|---|
| $I/I_o$ | 100 | 42 | 38 | 12 | 18 |

Chemical analysis

| MgO | 34.6 % | (6.00) |
|---|---|---|
| $Al_2O_3$ | 14.2 % | (1.0) |
| $S_2O_6$ | 22.7 % | (1.01) |
| $H_2O$ | 31.4 % | (12.30) |

EXAMPLE 17

A solution of 24.4 g of $MgCl_2\cdot 6H_2O$ and 15.0 g of $Al(NO_3)_3\cdot 9H_2O$ dissolved in 200 ml of water and a solution of 8.7 g of $K_2[Pt(CN)_4]\cdot 3H_2O$ dissolved in 100 ml of warm water were added dropwise to a beaker charged with 80 ml of water in the same manner as in Example 8 while maintaining the pH of the reaction liquor at 9.0 – 10.5. The reaction temperature was maintained at 60° – 70°C. The resulting suspension was posttreated in the same manner as in Example 8. Results of the analysis of the product are as follows:

Composition formula
$Mg_6Al_2(OH)_{16}Pt(CN)_4\cdot 4H_2O$    $K = 10.7$
   $x/y = 3$
   $z/(x+y) = 1/8$ X-ray diffraction

| $d(A)$ | 7.96 | 3.98 | 2.60 | 2.33 | 1.53 |
|---|---|---|---|---|---|
| $I/I_o$ | 100 | 50 | 26 | 30 | 30 |

Chemical analysis

| MgO | 27.1 % | (6.00) |
|---|---|---|
| $Al_2O_3$ | 11.3 % | (1.0) |
| $Pt(CN)_4$ | 35.2 % | (1.00) |
| $H_2O$ | 5.4 % | (12.1) |

EXAMPLE 18

A solution of 24.4 g of $MgCl_2\cdot 6H_2O$ and 15.0 g of $Al(NO_3)_3\cdot 9H_2O$ dissolved in 200 ml of water and a solution of 14.3 g of $Na_2HPO_4\cdot 12H_2O$ dissolved in 100 ml of water were added dropwise to a beaker charged with 60 ml of water in the same manner as in Example 8, while the pH of the reaction liquor was maintained at 9.5 – 10.5. The resulting suspension was treated in the same manner as in Example 8. Results of the analysis of the product are as follows:

Composition formula
$Mg_6Al_2(OH)_{16}HPO_4\cdot 4H_2O$    $K = 6.5$
   $x/y = 3$
   $z/(x+y) = 1/8$ X-ray diffraction

| $d(A)$ | 7.89 | 3.95 | 2.61 | 2.34 |
|---|---|---|---|---|
| $I/I_o$ | 100 | 35 | 44 | 28 |

Chemical analysis

| MgO | 37.9 % | (6.00) |
|---|---|---|
| $Al_2O_3$ | 16.0 % | (1.0) |
| $HPO_4$ | 14.6 % | (1.00) |
| $H_2O$ | 34.4 % | (12.00) |

EXAMPLE 19

The reaction was conducted in the same manner as in Example 16 by using 24.4 g of $MgCl_2\cdot 6H_2O$, 15.0 g of $Al(NO_3)_3\cdot 9H_2O$ and 6.9 g of $K_2S_2O_3$ and maintaining the pH of the reaction liquor at 9.5 – 10.5. Results of the analysis of the product are as follows:

Composition formula
$Mg_6Al_2(OH)_{16}S_2O_3\cdot 4H_2O$    $K = 11.5$
   $x/y = 3$
   $z/(x+y) = 1/8$ X-ray diffraction

| $d(A)$ | 8.15 | 3.99 | 2.59 | 1.53 | 1.45 |
|---|---|---|---|---|---|
| $I/I_o$ | 100 | 40 | 30 | 15 | 15 |

Chemical analysis

| MgO | 37.0 % | (6.00) |
|---|---|---|
| $Al_2O_3$ | 15.6 % | (1.0) |
| $S_2O_3$ | 17.1 % | (1.00) |
| $H_2O$ | 32.4 % | (11.80) |

EXAMPLE 20

A solution of 24.4 g of $MgCl_2\cdot 6H_2O$ and 15.0 g of $Al(NO_3)_3\cdot 9H_2O$ dissolved in 200 ml of water and a solution of 4 g of $H_2GeO_3$ dissolved in 500 ml of water were added dropwise to a beaker charged with 100 ml of water under agitation while maintaining the liquid temperature at 20° – 30°C. and adjusting the pH of the reaction liquor to 9.5 – 10.5 by the dropwise addition of a NaOH aqueous solution of a concentration of 2.0 moles per liter. The resulting suspension was treated in the same manner as in Example 16. Results of the analysis of the product are as follows:

Composition formula
$Mg_6Al_2(OH)_{16}GeO_3\cdot 4H_2O$    $K = 4.7$
   $x/y = 3$
   $z/(x+y) = 1/8$ X-ray diffraction

| $d(A)$ | 9.40 | 4.70 | 2.70 | 1.54 |
|---|---|---|---|---|
| $I/I_o$ | 100 | 20 | 22 | 18 |

Chemical analysis

| MgO | 35.8 % | (6.00) |
|---|---|---|
| $Al_2O_3$ | 15.2 % | (1.0) |
| $GeO_3$ | 18.2 % | (1.01) |
| $H_2O$ | 31.6 % | (11.80) |

EXAMPLE 21

The reaction was conducted in the same manner as in Example 16 by using 24.4 g of $MgCl_2 \cdot 6H_2O$, 15.0 g of $Al(NO_3)_3 \cdot 9H_2O$ and 10.2 g of $Na_2SO_3 \cdot 7H_2O$ and maintaining the pH of the reaction liquor at 9.5 – 10.5. The resulting suspension was gradually agitated at 50°C. for 5 hours, and then it was post-treated in the same manner as in Example 16. Results of the analysis of the product are as follows:

Composition formula
$Mg_6Al_2(OH)_{16}SO_3 \cdot 4H_2O$       $K = 8.3$
$x/y = 3$
$z/(x+y) = 1/8$ X-ray diffraction

| d(A) | 7.89 | 3.94 | 2.60 | 2.37 | 1.55 | 1.52 |
|---|---|---|---|---|---|---|
| $I/I_0$ | 100 | 44 | 36 | 30 | 115 | 115 |

Chemical analysis

| | | |
|---|---|---|
| MgO | 38.4 % | (6.00) |
| $Al_2O_3$ | 15.9 % | (1.0) |
| $SO_3$ | 12.7 % | (10.99) |
| $H_2O$ | 33.8 % | (12.10) |

EXAMPLE 22

Into 200 ml of water 15.6 g of $MgCl_2 \cdot 6H_2O$ were dissolved, 7.5 g of $Al(NO_3)_3 \cdot 9H_2O$ and 5.4 g of $FeCl_3 \cdot 6H_2O$. Separately, 4.7 g of $Na_2CrO_4 \cdot 4H_2O$ were dissolved in 100 ml of water. Together with an aqueous solution containing 2.0 moles per liter of NaOH, both liquors were added dropwise to a four-neck flask charged with 100 ml of water at room temperature under agitation in a $N_2$ gas current. The addition of the NaOH aqueous solution was controlled so that the pH of the reaction liquor was maintained above 13. The resulting suspension was filtered, and the remaining precipitate was washed with 200 ml of water and dried at 60°C. for 10 hours. Results of the analysis of the product are as follows:

Composition formula
$Mg_4(AlFe)(OH)_{12.5}(CrO_4)_{0.76} \cdot 3H_2O$
$K = 11.5$ (Mg-$CrO_4$ series)
$x/y = 3$
$z/(x+y) = 1/8$ X-ray diffraction

| d(A) | 7.82 | 3.85 | 2.58 | 2.30 | 1.51 |
|---|---|---|---|---|---|
| $I/I_0$ | 100 | 45 | 40 | 15 | 16 |

Chemical analysis

| | | |
|---|---|---|
| MgO | 30.1 % | (4.00) |
| $Al_2O_3$ | 9.5 % | (0.50) |
| $Fe_2O_3$ | 14.9 % | (0.50) |
| $CrO_4$ | 16.5 % | (0.76) |
| $H_2O$ | 31.9 % | (9.47) |

EXAMPLE 23

In 200 ml of water 10.8 g of $FeCl_3 \cdot 7H_2O$, 8.0 g of $Cr(NO_3)_3 \cdot 9H_2O$ and 24.4 g of $MgCl_2 \cdot 6H_2O$, were dissolved and the pH of the solution was adjusted to 1 by addition of concentrated nitric acid so as to prevent the hydrolysis of ferric chloride and chromium nitrate. Separately, 13.0 g of $Na_2SO_4 \cdot 7H_2O$ were dissolved in 100 ml of water. Both liquors were added dropwise to a 500-ml capacity flask at room temperature under agitation together with an aqueous solution containing 2.0 moles per liter of NaOH while the pH of the mixture was maintained above 13.0. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows:

Composition formula
$Mg_6(FeCr)(OH)_{16}SO_4 \cdot 4H_2O$      $K = 11.4$
$x/y = 3$
$z/(x+y) = 1/8$ X-ray diffraction

| d(A) | 8.11 | 4.02 | 2.58 | 1.52 |
|---|---|---|---|---|
| I/I | 100 | 28 | 15 | 11 |

Chemical analysis

| | | |
|---|---|---|
| MgO | 34.4 % | (5.97) |
| $Fe_2O_3$ | 11.5 % | (0.50) |
| $Cr_2O_3$ | 11.0 % | (0.48) |
| $SO_4$ | 13.7 % | (0.99) |
| $H_2O$ | 32.0 % | (12.3) |

EXAMPLE 24

$Al_2(SO_4)_3 \cdot 18H_2O$ and $Mg(NO_3)_2 \cdot 6H_2O$ were dissolved in water so that the concentration of each salt was 0.4 mole/liter. The so formed liquor, a $Na_2CrO_4$ solution of a concentration of 0.2 mole/liter and a NaOH solution of a concentration of 4.0 moles/liter were added dropwise under agitation to a reaction tank charged with 500 ml of water at feed rates of 20 ml/min, 15 ml/min and about 14 ml/min, respectively. The reaction tank was kept in a thermostat tank so that the temperatuare of the reaction liquor was maintained at 30° ± 1°C. In 20 minutes after initiation of the reaction, the pH became stable and maintained at 9.5 ± 0.1. About 45 minutes after initiation of the reaction, the overflowing of the reaction suspension took place, and the liquor which overflowed was continuously collected and heated at 80°C. for 5 hours. The reaction was continued for 2 hours, and the heat-treated reaction suspension was subjected to the water-removing treatment under reduced pressure. The remaining solid was washed with 1,000 ml of water and dried at 80°C. for 10 hours. Results of the analysis of the product are as follows:

Composition formula
$MfAl_2(OH)_{7.2}(CrO_4)_{0.4} \cdot 0.8H_2O$      $K = 5.7$
$d/y = 1/2$
$z/(x+y) = 1/7.5$ X-ray diffraction

| d(A) | 7.34 | 3.63 | 2.55 | 2.28 | 1.94 | 1.52 | 1.48 |
|---|---|---|---|---|---|---|---|
| $I/I_0$ | 100 | 48 | 18 | 18 | 16 | 10 | 10 |

Chemical analysis

| | | |
|---|---|---|
| MgO | 15.4 % | (1.00) |
| $Al_2O_3$ | 39.0 % | (1.0) |
| $CrO_4$ | 17.7 % | (0.40) |
| $H_2O$ | 30.2 % | (4.32) |

EXAMPLE 25

$Al_2(SO_4)_3 \cdot 18H_2O$ and $Mg(NO_3)_2 \cdot 6H_2O$ were dissolved in water so that the concentration of the aluminum salt was 0.2 mole/liter and the concentration of the magnesium salt was 0.60 mole/liter. The so formed liquor and a $Na_2CrO_4$ solution of a concentration of 0.20 mole/liter were fed to 2-liter capacity reaction tank equipped with an overflowed device, at feed rates of 30 ml/min and 19 ml/min, respectively. Ammonia gas was blown from the bottom of the reaction tank and the reaction tank had been charged with 500 ml of water in advance. The agitation was effected at 800 r.p.m. by a stirrer. The reaction tank was kept in a thermostat tank so that the temperature of the reaction liquor was maintained at 30°± 1°C. Two pH electrodes were inserted into the reaction tank to connect pH meters positioned in the upper and middle portions of the reaction tank, and the pH of the reaction suspension was maintained at 9.5 – 10.0 by adjusting the being of the ammonia gas. In about 20 minutes from the initiation of the reaction, the pH became stable and was in the range of 9.8 ± 0.1 at which the reaction was allowed to advance constantly. The reaction liquor which overflowed for about 40 minutes from the initiation of the reaction was thrown away, and the reaction suspension which overflowed after that time was continuously collected and treated in the same manner as in Example 24, except that after the water washing, water was added in such an amount that the liquor had the original volume and then it was heat-treated. Results of the analysis of the product are as follows:

Composition formula
$Mg_{3.2}Al_2(OH)_{11.1}(CrO_4)_{0.63} \cdot 2.2H_2O$
$K = 5.7$
$x/y = 1.6$
$z/(x+y) = 1/8.25$ X-ray diffraction

| $d(Å)$ | 7.69 | 3.85 | 2.58 | 2.29 | 1.96 | 1.52 | 1.48 |
|---|---|---|---|---|---|---|---|
| $I/I_o$ | 100 | 47 | 32 | 32 | 29 | 13 | 15 |

Chemical analysis

| MgO | 29.8 % | (3.21) |
|---|---|---|
| $Al_2O_3$ | 23.5 % | (1.0) |
| $CrO_4$ | 16.9 % | (1.63) |
| $H_2O$ | 32.0 % | (7.71) |

EXAMPLE 26

$Al_2(SO_4)_3 \cdot 18H_2O$ and $MgCl_2 \cdot 6H_2O$ were dissolved in water so that the concentration of the aluminum salt was 0.1 mole/liter and the concentration of the magnesium salt was 0.50 mole/liter. The so formed liquor and a $Na_2CrO_4$ solution of a concentration of 0.15 mole/liter were fed to the same reaction tank as used in Example 25 at feed rates of 25 ml/min and 16 ml/min, respectively. The reaction was conducted in the same manner as in Example 25 while adjusting the pH of the reaction liquor to 10.0 – 10.5. The resulting suspension was treated in the same manner as in Example 25. Results of the analysis of the product are as follows :

Composition formula
$Mg_{5.0}Al_2(OH)_{14.3}(CrO_4)_{0.9} \cdot 3.4H_2O$
$K = 5.7$
$x/y = 2.5$
$z/(x+y) = 1/7.7$ X-ray diffraction

| $d(Å)$ | 7.82 | 3.85 | 2.59 | 2.30 | 1.95 | 1.52 | 1.50 |
|---|---|---|---|---|---|---|---|
| $I/I_o$ | 100 | 34 | 25 | 23 | 24 | 11 | 11 |

Chemical analysis

| MgO | 34.5 % | (5.01) |
|---|---|---|
| $Al_2O_3$ | 17.4 % | (1.0) |
| $CrO_4$ | 17.4 % | (0.87) |
| $H_2O$ | 33.4 % | (12.39) |

EXAMPLE 27

$Al_2(SO_4)_3 \cdot 18H_2O$ and $MgCl_2 \cdot 6H_2O$ were dissolved in water so that the concentration of the aluminum salt was 0.10 mole/liter and the concentration of the magnesium salt was 0.70 mole/liter. The so formed liquor and a $Na_2CrO_4$ solution of a concentration of 0.20 mole/liter were fed to the same reaction tank as used in Example 25 at feed rates of 45 ml/min and 24 ml/min, respectively. The reaction was conducted in the same manner as in Example 25 while adjusting the pH of the reaction liquor to 10.2 – 10.7. The resulting suspension was treated in the same manner as in Example 25 except that the hydrothermal treatment was conducted at 90°C. Results of the analysis of the product are as follows :

Composition formula
$Mg_{6.9}Al_2(OH)_{17.5}(CrO_4)_{1.1} \cdot 3.8H_2O$
$K = 5.7$
$x/y = 3.45$
$z/(x+y) = 1/7.87$ X-ray diffraction

| $d(Å)$ | 8.04 | 3.97 | 2.60 | 2.38 | 1.98 | 1.54 | 1.51 |
|---|---|---|---|---|---|---|---|
| $I/I_o$ | 100 | 37 | 24 | 24 | 18 | 12 | 12 |

Chemical analysis

| MgO | 38.9 % | (6.88) |
|---|---|---|
| $Al_2O_3$ | 14.3 % | (1.0) |
| $CrO_4$ | 17.5 % | (1.08) |
| $H_2O$ | 31.4 % | (12.49) |

EXAMPLE 28

$Al_2(SO_4)_3 \cdot 18H_2O$ and $MgCl_2 \cdot 6H_2O$ were dissolved in water so that the concentration of the aluminum salt was 0.10 mole/liter and the concentration of the magnesium salt was 0.85 mole/liter. The so formed liquor and a $Na_2CrO_4$ solution of a concentration of 0.20 mole were fed to the same reaction tank as used in Example 25, at feed rates of 50 ml/min and 35 ml/min, respectively. The reaction was conducted in the same manner as in Example 25, while adjusting the pH of the reaction liquor to 10.3 – 10.9. The resulting suspension was treated in the same manner as in Example 27. Results of the analysis of the product are as follows :

Composition formula
$Mg_{8.5}Al_2(OH)_{20.3}(CrO_4)_{1.4} \cdot 3.7H_2O$
$K = 5.7$
$x/y = 4.25$
$z/(x+y) = 1/7.78$ X-ray diffraction

| $d(Å)$ | 8.11 | 4.02 | 2.61 | 2.35 | 1.54 | 1.52 |
|---|---|---|---|---|---|---|
| $I/I_o$ | 100 | 38 | 26 | 21 | 112 | 15 |

Chemical analysis

| MgO | 41.0 % | (8.50) |
|---|---|---|
| $Al_2O_3$ | 12.2 % | (1.0) |
| $CrO_4$ | 19.7 % | (1.42) |
| $H_2O$ | 30.0 % | (13.92) |

EXAMPLE 29

$Al_2(SO_4)_3 \cdot 18H_2O$ and $MgCl_2 \cdot 6H_2O$ were dissolved in water so that the concentration of the aluminum salt was 0.05 mole/liter and the concentration of the magnesium salt was 0.50 mole/liter. The so formed liquor and a $Na_2CrO_4$ solution of a concentration of 0.10 mole/liter were fed to the same reaction tank as used in Example 25 at feed rates of 30 ml/min and 23 ml/min, respectively. The reaction was conducted in the same manner as in Example 25 while adjusting the pH of the reaction liquor to 10.3 – 10.8. The resulting suspension was treated in the same manner as in Example 27. Results of the analysis of the product are as follows :

Composition formula
$Mg_{10}Al_2(OH)_{22.8}(CrO_4)_{1.6} \cdot 3.7H_2O$
$K = 5.7$
$x/y = 5$
$z/(x+y) = 1/7.5$ X-ray diffraction

| $d(Å)$ | 8.18 | 4.07 | 2.60 | 1.89 | 1.54 | 1.52 |
|---|---|---|---|---|---|---|

-Continued

Composition formula

| | | | | | |
|---|---|---|---|---|---|
| $I/I_o$ 100 | 35 | 29 | 23 | 18 | 18 |

Chemical analysis

| | | |
|---|---|---|
| MgO | 43.0 % | (9.98) |
| $Al_2O_3$ | 10.9 % | (1.0) |
| $CrO_4$ | 20.0 % | (1.61) |
| $H_2O$ | 28.9 % | (15.02) |

EXAMPLE 30

$Al_2(SO_4)_3 \cdot 18H_2O$ and $MgCl_2 \cdot 6H_2O$ were dissolved in water so that the concentration of the aluminum salt was 0.05 mole/liter and the concentration of the magnesium salt was 0.70 mole/liter. The so formed liquor and a $Na_2CrO_4$ aqueous solution of a concentration of 0.10 mole/liter were fed to the same reaction tank as used in Example 25 at feed rates of 15 ml/min and 15 ml/min, respectively. The reaction was conducted in the same manner as in Example 25 while adjusting the pH of the reaction liquor to 10.3 – 10.8. The resulting suspension was treated in the same manner as in Example 27. Results of the analysis of the product are as follows :

Composition formula
$Mg_{14}Al_2(OH)_{29.6}(CrO_4)_{2.2} \cdot 4.2H_2O$
$K = 5.7$
$x/y = 7$
$z/(x+y) = 1/7.17$ X-ray diffraction

| $d(A)$ | 8.24 | 4.10 | 2.64 | 1.53 |
|---|---|---|---|---|
| $I/I_o$ | 100 | 12 | 6 | 4 |

Chemical analysis

| | | |
|---|---|---|
| MgO | 45.9 % | (14.04) |
| $Al_2O_3$ | 8.1 % | (1.0) |
| $CrO_4$ | 20.7 % | (2.21) |
| $H_2O$ | 26.5 % | (18.16) |

EXAMPLE 31

$Al_2(SO_4)_3 \cdot 18H_2O$ and $MgCl_2 \cdot 6H_2O$ were dissolved in water so that the concentration of the aluminum salt was 0.05 mole/liter and the concentration of the magnesium salt was 0.80 mole/liter. The so formed liquor and a $Na_2CrO_4$ solution of a concentration of 0.10 mole/liter were fed to the same reaction tank as used in Example 25 at feed rates of 30 ml/min and 34 ml/min, respectively. The reaction was conducted in the same manner as in Example 25 while maintaining the pH of the reaction liquor at 10.3 – 10.8. The resulting suspension was treated in the same manner as in Example 27. Results of the analysis of the product are as follows:

Composition formula
$Mg_{16.2}Al_2(OH)_{33.4}(CrO_4)_{2.5} \cdot 4.3H_2O$
$K = 5.7$
$x/y = 8.1$
$z/(x+y) = 1/7.28$ X-ray diffraction

| $d(A)$ | 8.34 | 4.14 | 2.69 | 1.54 |
|---|---|---|---|---|
| $I/I_o$ | 100 | 23 | 20 | 8 |

Chemical analysis

| | | |
|---|---|---|
| MgO | 47.2 % | (16.04) |
| $Al_2O_3$ | 7.4 % | (1.0) |
| $CrO_4$ | 21.0 % | (2.49) |
| $H_2O$ | 25.6 % | (19.57) |

EXAMPLE 32

An aqueous solution containing 0.288 mole per liter of $FeCl_3 \cdot 6H_2O$, the pH of which was maintained at 1 by addition of concentrated hydrochloric acid so as to prevent hydrolysis, and an aqueous solution containing 0.864 mole per liter of $MgCl_2 \cdot 6H_2O$ were sprayed uniformly on the surface of the reaction liquor from the upper portion of a reaction tank via 500 holes of 0.3 mm diameter of a sprayer composed of a synthetic resin. The feed rate of each solution was 11.3 ml/min. The reaction tank was a 2-liter capacity cylindrical reaction and the temperature inside the reaction was maintained at 30° ± 1°C. The reaction system was agitated at a constant rate by a propeller stirrer. The agitation direction of the stirrer was the upward direction. From the bottom of the reactor an aqueous solution containing 0.144 mole per liter of $Na_2HPO_4$ and another aqueous solution containing 3.56 mole per liter of NaOH were fed at feed rates of 22.6 ml/min and 14.6 ml/min, respectively, through a pipe so disposed that both aqueous solutions were fed from the central portion of the bottom of the reactor. The amount of NaOH fed was so adjusted that a pH electrode would always indicate a value between 12.8 and 13.2. When the pH value became stable and the concentration of the reaction liquor was constant, the reaction suspension which overflowed was collected. The residence time of the reaction liquor in the reactor was about 35 minutes. The resulting suspension was heated at 70°C. for 5 hours and cooled. Post-treatments were conducted in the same manner as in Example 1. Results of the analysis of the product are as follows:

Composition formula
$Mg_6Fe_2(OH)_{16}HPO_4 \cdot 4H_2O$
$K = 6.5$
$x/y = 3$
$z/(x+y) = 1/8$ X-ray diffraction

| $d(A)$ | 7.96 | 3.97 | 2.56 | 1.52 |
|---|---|---|---|---|
| $I/I_o$ | 100 | 33 | 28 | 25 |

Chemical analysis

| | | |
|---|---|---|
| MgO | 34.7 % | (6.01) |
| $Fe_2O_3$ | 22.9 % | (1.00) |
| $HPO_4$ | 13.8 % | (1.00) |
| $H_2O$ | 31.0 % | (12.0) |

EXAMPLE 33

In 200 ml of water 21.6 g of $FeCl_3 \cdot 6H_2O$ were dissolved and 24.4 g of $MgCl_2 \cdot 6H_2O$, and the ph of the solution was adjusted to 1 by addition of concentrated hydrochloric acid so as to prevent the hydrolysis of ferric chloride. Separately, 8.7 g of $K_2[Pt(CN)_4] \cdot 3H_2O$ were dissolved in 100 ml of water. Both liquors were added dropwise to a 500-ml capacity flask at room temperature under agitation together with an aqueous solution containing 2.0 moles per liter of NaOH while the pH of the mixture was maintained above 12.5. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows :

Composition formula
$Mg_6Fe_2(OH)_{16}Pt(CN)_4 \cdot 4H_2O$
$K = 10.7$
$x/y = 3$
$z/(x+y) = 1/8$ X-ray diffraction

| $d(A)$ | 11.78 | 5.82 | 3.98 | 1.58 |
|---|---|---|---|---|
| $I/I_o$ | 100 | 28 | 15 | 11 |

Chemical analysis

-Continued

| Composition formula | | |
|---|---|---|
| MgO | 26.9 % | (6.03) |
| Fe$_2$O$_3$ | 17.7 % | (1.00) |
| Pt(CN)$_4$ | 32.2 % | (1.00) |
| H$_2$O | 24.0 % | (12.01) |

EXAMPLE 34

In 200 ml of water 21.6 g of FeCl$_3$.6H$_2$O were dissolved and 24.4 g of MgCl$_2$.6H$_2$O, and the pH of the solution was adjusted to 1 by addition of concentrated hydrochloric acid so as to prevent the hydrolysis of ferric chloride. Separately, 8.8 g of K$_2$SeO$_4$ were dissolved into 100 ml of water. Both liquors were added dropwise to a 500-ml capacity flask at room temperature under agitation together with an aqueous solution containing 2.0 moles per liter of NaOH while the pH of the mixture was maintained above 12.5. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows :

Composition formula
Mg$_6$Fe$_2$(OH)$_{16}$SeO$_4$.4H$_2$O     K = 5.8
                                          $x/y = 3$
                                          $z/(x+y) = 1/8$ X-ray diffraction

| d(A) | 8.11 | 3.95 | 2.66 | 1.53 |
|---|---|---|---|---|
| I/I$_o$ | 100 | 28 | 15 | 11 |

Chemical analysis

| MgO | 32.5 % | (6.02) |
|---|---|---|
| Fe$_2$O$_3$ | 21.4 % | (1.0) |
| SeO$_4$ | 19.2 % | (1.13) |
| H$_2$O | 29.2 % | (12.09) |

EXAMPLE 35

Sixteen g. of Cr(NO$_3$)$_3$.9H$_2$O were dissolved in 100 ml of a magnesium chloride solution of a concentration of 1.2 moles per liter calculated as MgO, and the pH of the solution was adjusted to 1 by addition of concentrated hydrochloric acid. The so formed liquor, 25.6 ml of a K$_2$CrO$_4$ solution of a concentration of 0.2 mole per liter and a caustic soda solution of a concentration of 2.0 moles per liter were added dropwise to a 500-ml capacity beaker charged with 80 ml of water. The ph of the reaction suspension was maintained above 13 by controlling the addition of the caustic soda solution. The resulting suspension was dehydrated under reduced pressure, and the residue was washed and dried. Results of the analysis of the product are as follows :

Composition formula
Mg$_6$Cr$_2$(OH)$_{16}$CrO$_4$.4H$_2$O     K = 11.5
                                          $x/y = 3$
                                          $z/(x+y) = 1/8$ X-ray diffraction

| d(A) | 7.82 | 3.90 | 2.59 | 1.52 |
|---|---|---|---|---|
| I/I$_o$ | 100 | 30 | 25 | 20 |

Chemical analysis

| MgO | 34.1 % | (6.01) |
|---|---|---|
| Cr$_2$O$_3$ | 21.4 % | (1.0) |
| CrO$_4$ | 16.3 % | (1.01) |
| H$_2$O | 30.3 % | (11.98) |

EXAMPLE 36

The following four solutions, namely (1) an aqueous solution of a mixture of MgCl$_2$.6H$_2$O and Mg(NO$_3$)$_2$.6H$_2$O of a 2:2 molar ratio, which has a magnesium salt concentration of 0.6 mole/liter calculated as MgO, (2) an aquwous solution of Cr(NO$_3$)$_3$.9H$_2$O of a concentration of 0.2 mole/liter calculated as Cr$_2$O$_3$, the pH of which had been adjusted to 1 by hydrochloric acid so as to prevent hydrolysis, (3) an aqueous solution of Na$_2$SO$_3$ of a concentration of 0.1 mole/liter and (4) an aqueous solution of NaOH of a concentration of 2.0 moles/liter, were fed to a reaction tank at rates of 20 ml/min, 20 ml/min, 20 ml/min and 18 ml/min, respectively, by means of controllable pumps. The reaction tank was a 2,000-ml capacity cylindrical reactor equipped with a constant rate stirrer, which was charged with 500 ml of water in advance. With a view to adjusting the pH of the reaction liquor to a range of 8 – 9 where the development of polymerization of trivalent chromium hydroxide is low, the pH was maintained at 8.5 ± 0.1 by adjusting the feed of the caustic soda solution. The reaction was conducted under agitation by the constant rate stirrer. The reaction suspension which overflowed in 90 minutes from the initiation of the reaction was thrown away, and the suspension which overflowed after that time was collected and subjected to the hydrothermal treatment at 150°C. for 5 hours in an autoclave. Then water was removed therefrom under reduced pressure, and the residue was washed with 250 ml of water and dried at 70°C. for 15 hours. Results of the analysis of the product are as follows :

Composition formula
Mg$_6$Cr$_2$(OH)$_{16}$SO$_3$.4H$_2$O     K = 8.3
                                         $x/y = 3$
                                         $z/(x+y) = 1/8$ X-ray diffraction

| d(A) | 7.82 | 3.90 | 2.60 | 1.53 | 1.51 |
|---|---|---|---|---|---|
| I/I$_o$ | 100 | 42 | 25 | 10 | 4 |

Chemical analysis

| MgO | 35.9 % | (6.02) |
|---|---|---|
| Cr$_2$O$_3$ | 22.5 % | (1.0) |
| SO$_3$ | 11.9 % | (1.01) |
| H$_2$O | 31.4 % | (12.12) |

EXAMPLE 37

The following four liquors, namely (1) an aqueous solution containing 0.6 mole per liter of MgCl$_2$.6H$_2$O, calculated as MgO, (2) an aqueous solution containing 0.2 mole per liter of chromic chloride, the pH of which was adjusted to 1 by concentrated hydrochloric acid so as to prevent hydrolysis, (3) an aqueous solution containing 0.1 mole per liter of Na$_2$S$_2$O$_6$ and (4) an aqueous solution containing 2.0 moles per liter of NaOH, were fed at feed rates of 20 ml/min, 20 ml/min and 18 ml/min, respectively, by means of controllable pumps to a 2000-ml capacity cylindrical reaction tank maintained at 10 ± 1°C. The reaction tank had been charged with 500 ml of water in advance, and the reaction liquor was agitated at a constant rate by means of a constante rate stirrer. With a view to adjusting the pH of the reaction liquor to a range of 8 – 9 where the development of polymerization of trivalent chromium hydroxide is low, the pH of the reaction liquor was maintained at 8.5 ± 0.1 by controlling the caustic soda aqueous solution feed rate. The liquor which overflowed in 90 minutes from the initiation of the reaction was thrown away, and the reaction suspension overflown after that time was collected and subjected to the hydrothermal treatment at 150°C. for 5 hours in an autoclave. Then water was removed from the suspension under reduced pressure, and the residue was washed with 250 ml of water and dried at 70°C. for 15 hours. Results of the analysis of the product are as follows:

Composition formula
Mg$_6$Cr$_2$(OH)$_{16}$S$_2$O$_6$.4H$_2$O   K = 11.7
                                           $x/y = 3$
                                           $z/(x+y) = 1/8$ X-ray diffraction

| d(A) | 8.04 | 4.04 | 2.57 | 1.53 | 1.51 |
|---|---|---|---|---|---|
| I/I$_o$ | 100 | 42 | 25 | 10 | 4 |

Chemical analysis

| MgO | 32.1 % | |
|---|---|---|
| Cr$_2$O$_3$ | 20.2 % | (1.0) |
| S$_2$O$_6$ | 21.2 % | (1.01) |
| H$_2$O | 28.7 % | (12.01) |

EXAMPLE 38

In 200 ml of water 21.6 g of FeCl$_3$.6H$_2$O were dissolved and 24.4 g of MgCl$_2$.6H$_2$O, and the pH of the solution was adjusted to 1 by addition of concentrated hydrochloric acid so as to prevent the hydrolysis of ferric chloride. Separately, 18.5 g of K$_2$MoO$_4$ were dissolved into 100 ml of water. Both liquors were added dropwise to a 500-ml capacity flask at room temperature under agitation together with an aqueous solution containing 2.0 moles per liter of NaOH while the pH of the mixture was maintained above 13.0. During the reaction air decarbonated with concentrated KOH aqueous solution was fed to the flask. In the decarbonated air the resulting suspension was filtered, and the precipitate was washed with water and dried at 80°C. for 10 hours in the same atmosphere. Results of the analysis of the product are as follows:

Composition formula
Mg$_6$Fe$_2$(OH)$_{16}$MoO$_4$.4H$_2$O   K = 10.6
                                         $x/y = 3$
                                         $z/(x+y) = 1/8$ X-ray diffraction

| d(A) | 8.93 | 4.47 | 2.52 | 1.52 |
|---|---|---|---|---|
| I/I$_o$ | 100 | 28 | 15 | 15 |

Chemical analysis

| MgO | 31.8 % | (6.00) |
|---|---|---|
| Fe$_2$O$_3$ | 21.0 % | (1.0) |
| MoO$_4$ | 21.0 % | (1.01) |
| H$_2$O | 28.3 % | (11.99) |

EXAMPLE 39

An aqueous solution containing 0.288 mole per liter of FeCl$_3$.6H$_2$O, the pH of which was maintained at 1 by addition of concentrated hydrochloric acid so as to prevent hydrolysis, and an aqueous solution containing 0.864 mole per liter of Mg(NO$_3$)$_2$.6H$_2$O were sprayed uniformly on the surface of the reaction liquor from the upper portion of a reaction tank via 500 holes of 0.3 mm diameter of a sprayer composed of a synthetic resin. The feed rate of each solution was 11.3 ml/min. The reaction tank was a 2-liter capacity cylindrical reaction and the temperature inside the reactor was maintained at 30°± 1°C. The reaction system was agitated at a constant rate by a propeller stirrer. The agitation direction of the stirrer was the upward direction. From the bottom of the reactor an aqueous solution containing 0.144 mole per liter of K$_2$GeO$_3$ and another aqueous solution containing 3.56 moles per liter of NaOH were fed at feed rates of 22.6 ml/min and 14.6 ml/min, respectively, through a pipe so disposed that both aqueous solutions were fed from the central portion of the bottom of the reactor. The amount of NaOH fed was so adjusted that a pH electrode would always indicate a value between 12.5 and 13.0. When the pH value became stable and the concentration of the reaction liquor was constant, the reaction suspension which overflowed was collected. The residence time of the reaction liquor in the reactor was about 35 minutes. The resulting suspension was heated at 70°C. for 5 hours and cooled. Post-treatments were conducted in the same manner as in Example 1. Results of the analysis of the product are as follows:

Composition formula
Mg$_6$Fe$_2$(OH)$_{16}$GeO$_3$.4H$_2$O   K = 4.7
                                         $x/y = 3$
                                         $z/(x+y) = 1/8$ X-ray diffraction

| d(A) | 9.30 | 14.00 | 2.66 | 1.53 |
|---|---|---|---|---|
| I/I$_o$ | 100 | 33 | 28 | 8 |

Chemical analysis

| MgO | 33.5 % | (6.00) |
|---|---|---|
| Fe$_2$O$_3$ | 22.1 % | (1.0) |
| GeO$_3$ | 16.7 % | (1.01) |
| H$_2$O | 30.0 % | (12.05) |

EXAMPLE 40

The following four liquors, namely (1) an aqueous solution containing 0.6 mole per liter of MgCl$_2$.6H$_2$O, calculated as MgO, (2) an aqueous solution containing 0.2 mole per liter of chromic chloride, the pH of which was adjusted to 1 by concentrated hydrochloric acid so as to prevent hydrolysis, (3) an aqueous solution containing 0.1 mole per liter of K$_2$S$_2$O$_3$ and (4) an aqueous solution containing 2.0 moles per liter of NaOH, were fed at feed rates of 20 ml/min, 20 ml/min, 20 ml/min and 18 ml/min, respectively, by means of controllable pumps to a 2,000-ml capacity cylindrical reaction tank maintained at 10°± 1°C. The reaction tank had been charged with 500 ml of water in advance, and the reaction liquor was agitated at a constant rate by means of a constant rate stirrer. With a view to adjusting the pH of the reaction liquor to a range of 8 – 9 where the development of polymerization of trivalent chromium hydroxide is low, the pH of the reaction liquor was maintained at 8.5 ± 0.1 by controlling the caustic soda aqueous solution feed rate. The liquor which overflowed in 90 minutes from the initiation of the reaction was thrown away, and the reaction suspension which overflowed after that time was collected and subjected to the hydrothermal treatment at 150°C. for 5 hours in an autoclave. Then water was removed from the suspension under reduced pressure, and the residue was washed with 250 ml of water and dried at 150°C. for 5 hours. Results of the analysis of the product are as follows:

Composition formula
Mg$_6$Cr$_2$(OH)$_{16}$S$_2$O$_3$.4H$_2$O   K = 11.5
                                            $x/y = 3$
                                            $z/(x+y) = 1/8$ X-ray diffraction

| d(A) | 8.11 | 3.93 | 2.58 | 1.53 |
|---|---|---|---|---|
| I/I$_o$ | 100 | 42 | 25 | 10 | uz,3/12 Chemical analysis

| MgO | 34.3 % | (6.02) |
|---|---|---|
| Cr$_2$O$_3$ | 21.5 % | (1.0) |
| S$_2$O$_3$ | 15.6 % | (0.98) |
| H$_2$O | 30.0 % | (11.99) |

EXAMPLE 41

The following four solutions, namely (1) an aqueous solution of a 2:2 molar ratio mixture of $MgCl_2.6H_2O$ and $Mg(NO_3)_2.6H_2O$ having a magnesium salt concentration of 0.6 mole/liter calculated as MgO, (2) an aqueous solution of $Cr(NO_3)_3.9H_2O$ of a concentration of 0.2 mole/liter calculated as $Cr_2O_3$, [the pH of which had been adjusted to 1 by hydrochloric acid so as to prevent hydrolysis,] (3) an aqueous solution of $K_2Pt(CN)_4$ of a concentration of 0.1 mole/liter and (4) an aqueous solution of NaOH of a concentration of 2.0 moles/liter, were fed to a reaction tank at rates of 20 ml/min, 20 ml/min, 20 ml/min and 18 ml/min, respectively, by means of controllable pumps. The reaction tank was a 2,000-ml capacity cylindrical reactor equipped with a constant rate stirrer, which was charged with 500 ml of water in advance. With a view to adjusting the pH of the reaction liquor to a range of 8 – 9 where the development of polymerization of trivalent hydroxide is low, the pH was maintained at 8.5 ± 0.1 by adjusting the feed of the caustic soda solution. The reaction was conducted under agitation by the constant rate stirrer. The reaction suspension which overflowed in 90 minutes from the initiation of the reaction was thrown away, and the suspension which overflowed after that time was collected and subjected to the hydrothermal treatment at 150°C. for 5 hours in an autoclave. Then water was removed from the suspension under reduced pressure, and the residue was washed with 250 ml of water and dried at 70°C. for 15 hours. Results of the analysis of the product are as follows :

Composition formula
$Mg_6Cr_2(OH)_{16}Pt(CN)_4.4H_2O$    $K = 10.7$
                                           $x/y = 3$
                                           $z/(x+y) = 1/8$ X-ray diffraction

| $d(Å)$ | 11.62 | 5.80 | 3.97 | 1.58 |
|---|---|---|---|---|
| $I/I_o$ | 100 | 442 | 25 | 20 |

Chemical analysis

| MgO | 27.1 % | (6.01) |
|---|---|---|
| $Cr_2O_3$ | 17.0 % | (1.0) |
| $Pt(CN)_4$ | 33.5 % | (1.01) |
| $H_2O$ | 23.9 % | (11.90) |

EXAMPLE 42

The following four solutions, namely (1) an aqueous solution of $MgCl_2.6H_2O$ of a concentration of 0.6 mole/liter calculated as MgO, (2) an aqueous solution of chromic chloride of a concentration of 0.2 mole/liter calculated as $Cr_2O_3$, [the pH of which had been adjusted to 1 by hydrochloric acid so as to prevent hydrolysis,] (3) an aqueous solution of $K_2GeO_3$ of a concentration of 0.1 mole/liter and (4) an aqueous solution of NaOH of a concentration of 2.0 moles/liter, were fed to a reaction tank at rates of 20 ml/min, 20 ml/min, 20 ml/min and 18 ml/min, respectively, by means of controllable pumps. The reaction tank was a 2000-ml capacity cylindrical reactor equipped with a constant rate stirrer, which was charged with 500 ml of water in advance. With a view to adjusting the pH of the reaction liquor to a range of 8 – 9 where the development of polymerization of trivalent chromium hydroxide is low, the pH was maintained at 8.5 ± 0.1 by adjusting the feed of the caustic soda solution. The reaction was conducted under agitation by the constant rate stirrer. The reaction suspension which overflowed in 90 minutes from the initiation of the reaction was thrown away, and the suspension which overflowed after that time was collected and subjected to the hydrothermal treatment at 150°C. for 5 hours in an autoclave. Then water was removed from the suspension under reduced pressure, and the residue was dried with 250 ml of water and dried at 70°C. for 15 hours. Results of the analysis of the product are as follows:

Composition formula
$Mg_6Cr_2(OH)_{16}GeO_3.4H_2O$    $K = 4.7$
                                       $x/y = 3$
                                       $z/(x+y) = 1/8$ X-ray diffraction

| $d(Å)$ | 9.30 | 4.60 | 2.67 | 1.53 |
|---|---|---|---|---|
| $I/I_o$ | 100 | 42 | 25 | 20 |

Chemical analysis

| MgO | 33.8 % | (5.98) |
|---|---|---|
| $Cr_2O_3$ | 21.3 % | (1.0) |
| $GeO_3$ | 16.9 % | (1.02) |
| $H_2O$ | 30.2 % | (11.99) |

EXAMPLE 43

A mixed liquor of 100 ml of a magnesium chloride solution containing 0.8 mole per liter of MgO and 100 ml of a ferric chloride solution containing 0.2 mole per liter of $Fe_2O_3$, the pH of which was adjusted to 1 by concentric hydrochloric acid, and another mixed liquor of 100 ml of a caustic soda solution containing 20 g of NaOH and 100 ml of a $Na_2CrO_4$ solution containing 0.8 g of $Na_2CrO_4$ were added dropwise to a 500-ml capacity beaker charged with 100 ml of water at room temperature under agitation. The addition of each liquor was so adjusted that the pH of the reaction liquor was maintained above 13.5. After completion of reaction, water was removed under reduced pressure from the resulting suspension; and the remaining solid was washed with 250 ml of water and dried at 70°C. for 10 hours. Results of the analysis of the product are as follows:

Composition formula
$Mg_4Fe_2(OH)12.5(CrO_4)_{0.76}.3H_2O$    $K = 11.5$
                                                   $x/y = 3$
                                                  $z/(x+y) = 1/8$ X-ray diffraction

| $d(Å)$ | 7.82 | 3.91 | 2.58 | 2.31 | 1.52 |
|---|---|---|---|---|---|
| $I/I_o$ | 100 | 42 | 12 | 9 | 8 |

Chemical analysis

| MgO | 28.6 % | (4.00) |
|---|---|---|
| $Fe_2O_3$ | 28.3 % | (1.0) |
| $CrO_4$ | 15.6 % | (0.77) |
| $H_2O$ | 29.5 % | (9.26) |

EXAMPLE 44

Into 200 ml of water 24.4 g of $MgCl_2.6H_2O$, 7.5 g of $Al(NO_3)_3.9H_2O$ were dissolved and 8.0 g of $Cr(NO_3)_3.9H_2O$, and the pH of the resulting liquor was adjusted to 1 by addition of concentrated nitric acid. Separately, a solution of 14.3 g of $Na_2HPO_4$ and 13 g of NaOH in 200 ml of water was prepared. Both liquors were added dropwise into a 500-ml capacity beaker charged with 100 ml of water so that the pH of the reaction liquor was maintained at 12 – 13. After completion of the reaction, the resulting suspension was treated in the same manner as in Example 1. The water used in this Example was decarbonated water, and the reaction was conducted in a $N_2$ gas current. Results of the analysis of the product are as follows:

Composition formula
$Mg_6(AlCr)(OH)_{16}HPO_4 \cdot 4H_2O$  K = 6.5 (Mg-HPO$_4$ series)
x/y = 3
z/(x+y) = 1/8

X-ray diffraction

| d(A) | 7.82 | 3.91 | 2.60 | 1.51 |
|---|---|---|---|---|
| I/I$_o$ | 100 | 48 | 21 | 7 |

Chemical analysis

| MgO | 36.2 % | (6.03) |
|---|---|---|
| Al$_2$O$_3$ | 7.7 % | (0.49) |
| HPO$_4$ | 14.2 % | (1.01) |
| H$_2$O | 32.0 % | (11.87) |

EXAMPLE 45

$MgCl_2 \cdot 6H_2O$ and $Al(NO_3)_3 \cdot 9H_2O$ were dissolved in water so that the concentration of the magnesium was 0.10 mole/liter and the concentration of the aluminum salt was 0.40 mole/liter. THe so formed liquor, a $Na_2SO_3$ aqueous solution of a concentration of 0.20 mole/liter and a NaOH aqueous solution were fed to a 2-liter capacity cylindrical reaction tank equipped with an overflow device, at feed rates of 4 ml/min, 22.5 ml/min and 25.5 ml/min, respectively. The reaction tank had been charged with 500 ml of water in advance. A constant rate stirrer was provided in the reaction tank and pH electrodes were inserted therein to connect pH meters and recorders. The temperature of the reaction tank was maintained at 40° ± 1°C. and the temperature of each liquor was adjusted to 40° ± 1°C. prior to feeding. In the initial stage of the reaction the pH of the reaction liquor was adjusted to 9.2 – 9.7 by controlling the feed rate of the NaOH solution, and when the reaction began to advance stably, the pH was maintained at 9.5 ± 0.1. The reaction was continued for 5 hours. The liquor which overflowed in two hours from the initiation of the reaction was thrown away, and the suspension which overflowed after that time was collected. Water was removed from the collected suspension under reduced pressure, and the residue was washed with water and dried at 80°C. Throughout the Example, decarbonated water was used and the reaction and post-treatment were conducted in the air decarbonated by concentrated KOH aqueous solution. Results of the analysis of the product are as follows:

Composition formula
$MgAl_4(OH)_{12.7}(SO_3)_{0.63} \cdot 1.6H_2O$
K = 8.3
x/y = 1/4
z/(x+y) = 1/7.93

X-ray diffraction

| d(A) | 7.55 | 3.77 | 2.58 | 1.52 |
|---|---|---|---|---|
| I/I$_o$ | 100 | 28 | 20 | 9 |

Chemical analysis

| MgO | 5.9 % | (0.50) |
|---|---|---|
| Al$_2$O$_3$ | 29.7 % | (1.0) |
| SO$_3$ | 7.3 % | (0.31) |
| H$_2$O | 58.6 % | (11.15) |

EXAMPLE 46

$MgCl_2 \cdot 6H_2O$ and $Al(NO_3)_3 \cdot 9H_2O$ were dissolved in water so that the concentration of the magnesium salt was 0.30 mole/liter and the concentration of the aluminum salt was 0.60 mole/liter. The so formed liquor, an aqueous solution of $Na_2SO_3$ of a concentration of 0.20 mole/liter and a 2N aqueous solution of NaOH were fed to the same reaction tank as used in Example 45 at feed rates of 20 m/min, 19 ml/min and 22 ml/min, respectively. The reaction was conducted in the same manner as in Example 45 while maintaining the pH of the reaction liquor to 9.5 – 10.0. The resulting suspension was treated in the same manner as in Example 45. Results of the analysis of the product are as follows:

Composition formula
$MgAl_2(OH)_{7.24}(SO_3)_{0.38} \cdot 1.2H_2O$
K = 8.3
x/y = 1/2
z/(x+y) = 1/7.9

X-ray diffraction

| d(A) | 7.62 | 3.79 | 2.58 | 2.28 | 1.93 | 1.51 |
|---|---|---|---|---|---|---|
| I/I$_o$ | 100 | 31 | 34 | 22 | 18 | 11 |

Chemical analysis

| MgO | 15.9 % | (1.0) |
|---|---|---|
| Al$_2$O$_3$ | 40.2 % | (1.0) |
| SO$_3$ | 12.0 % | (0.38) |
| H$_2$O | 33.9 % | (4.83) |

EXAMPLE 47

$MgCl_2 \cdot 6H_2O$ and $Al(NO_3)_3 \cdot 9H_2O$ were dissolved in water so that the concentration of the magnesium salt was 0.30 mole/liter and the concentration of the aluminum salt was 0.20 mole/liter. The so formed liquor, an aqueous solution of $Na_2SO_3$ of a concentration of 0.10 mole/liter and a 2N aqueous solution of NaOH were fed to the same reaction tank as used in Example 45 at feed rates of 40 ml/min, 25 ml/min and 21.5 ml/min, respectively. The reaction was conducted in the same manner as in Example 45 while maintaining the pH of the reaction liquor at 9.5 – 10.0. THe resulting suspension was treated in the same manner as in Example 45. Results of the analysis of the product are as follows:

Composition formula
$Mg_3Al_2(OH)_{10.74}(SO_3)_{0.63} \cdot 2.08H_2O$
K = 8.3
x/y = 1.5
z/(x+y) = 1/7.93

X-ray diffraction

| d(A) | 7.75 | 3.85 | 2.59 | 2.30 | 1.94 | 1.52 |
|---|---|---|---|---|---|---|
| I/I$_o$ | 100 | 30 | 31 | 22 | 20 | 18 |

Chemical analysis

| MgO | 30.4 % | (2.99) |
|---|---|---|
| Al$_2$O$_3$ | 25.7 % | (1.0) |
| SO$_3$ | 12.7 % | (0.63) |
| H$_2$O | 33.2 % | (7.11) |

EXAMPLE 48

$MgCl_2 \cdot 6H_2O$ and $Al(NO_3)_3 \cdot 9H_2O$ where dissolved in water so that the concentration of the magnesium salt was 0.50 mole/liter and the aluminum salt concentration was 0.20 mole/liter. The so formed liquor, an aqueous solution of $Na_2SO_3$ of a concentration of 0.20 mole/liter and a 4N aqueous solution of NaOH were fed to the same reaction tank as used in Example 45 at feed rates of 60 ml/min, 26.4 ml/min and 22 ml/min, respectively. The reaction was conducted in the same manner as in Example 45 while maintaining the pH of the reaction liquor at 9.7 – 10.3. The resulting suspension was treated in the same manner as in Example 45. Results of the analysis of the product are as follows:

Composition formula
$Mg_5Al_2(OH)_{14.2}(SO_3)_{0.88} \cdot 3.4H_2O$
K = 8.3
x/y = 2.5
z/(x+y) = 1/7.95

-Continued

X-ray diffraction

| d(Å) | 7.82 | 3.90 | 2.61 | 2.31 | 1.95 | 1.52 |
|---|---|---|---|---|---|---|
| I/I₀ | 100 | 40 | 42 | 31 | 18 | 16 |

Chemical analysis

| MgO | 36.7 % | (4.99) |
|---|---|---|
| Al₂O₃ | 18.6 % | (1.0) |
| SO₃ | 12.8 % | (0.88) |
| H₂O | 34.4 % | (10.48) |

EXAMPLE 49

An aqueous solution of MgCl₂.6H₂O of a concentration of 1.2 mole/liter, an aqueous solution of Al(NO₃)₃.9H₂O of a concentration of 0.4 mole/liter, an aqueous solution of Na₂SO₃ of a concentration of 0.2 mole/liter, and an aqueous solution of KOH of a concentration of 4.0 moles/liter were fed to the same reaction tank as used in Example 45 at feed rates of 10 ml/min, 10 ml/min, 15 ml/min and about 8 ml/min, respectively. The reaction was conducted in the same manner as in Example 45 while maintaining the pH of the reaction liquor at 10.0 – 10.5. The resulting suspension was treated in the same manner as in Example 45. Results of the analysis of the product are as follows:

Composition formula

Mg₆Al₂(OH)₁₆SO₃.4H₂O    K = 8.3
                         x/y = 3
                         z/(x+y) = 1/8

X-ray diffraction

| d(Å) | 7.89 | 3.94 | 2.60 | 2.37 | 1.55 | 1.52 |
|---|---|---|---|---|---|---|
| I/I₀ | 100 | 44 | 36 | 30 | 15 | 15 |

Chemical analysis

| MgO | 38.8 % | (6.02) |
|---|---|---|
| Al₂O₃ | 16.3 % | (1.0) |
| SO₃ | 12.8 % | (1.00) |
| H₂O | 34.6 % | (12.03) |

EXAMPLE 50

MgCl₂.6H₂O and Al(NO₃)₃.9H₂O were dissolved in water so that the magnesium salt concentration was 0.70 mole/liter and the aluminum salt concentration was 0.20 mole/liter. The so formed liquor, an aqueous solution of Na₂SO₃ of a concentration of 0.20 mole/liter and an aqueous solution of NaOH were fed to the same reaction tank as used in Example 45 at feed rates of 20 ml/min, 11.5 ml/min and 18 ml/min, respectively. The reaction was conducted in the same manner as in Example 45 while maintaining the pH of the reaction liquor at 9.8 – 10.3. The resulting suspension was treated in the same manner as in Example 45. Results of the analysis of the product are as follows:

Composition formula

Mg₇Al₂(OH)₁₇.₆(SO₃)₁.₂.4.9H₂O    K = 8.3
                                  x/y = 3.5
                                  z/(x+y) = 1/7.5

X-ray diffraction

| d(Å) | 8.04 | 3.98 | 2.60 | 2.34 | 1.98 | 1.52 |
|---|---|---|---|---|---|---|
| I/I₀ | 100 | 28 | 25 | 15 | 10 | 10 |

Chemical analysis

| MgO | 39.9 % | (7.01) |
|---|---|---|
| Al₂O₃ | 14.4 % | (1.0) |
| SO₃ | 13.6 % | (1.20) |
| H₂O | 34.5 % | (13.54) |

EXAMPLE 51

MgCl₂.6H₂O and Al(NO₃)₃.9H₂O were dissolved in water so that the magnesium salt concentration was 0.90 mole/liter and the aluminum salt concentration was 0.20 mole/liter. The so formed liquor, an aqueous solution of Na₂SO₃ concentration of 0.20 mole/liter and an aqueous solution of NaOH were fed to the same reaction tank as used in Example 45 at feed rates of 20 ml/min, 14 ml/min and 21 ml/min, respectively. The reaction was conducted in the same manner as in Example 45 while maintaining the pH of the reaction liquor at 9.8–10.5. The resulting suspension was treated in the same manner as in Example 45. Results of the analysis of the product are as follows:

Composition formula

Mg₉Al₂(OH)₂₁.₂(SO₃)₁.₄.4.9H₂O    K = 8.3
                                  x/y = 4.5
                                  z/(x+y) = 1/7.75

X-ray diffraction

| d(Å) | 8.18 | 4.04 | 2.62 | 2.36 | 1.96 | 1.53 |
|---|---|---|---|---|---|---|
| I/I₀ | 100 | 28 | 25 | 18 | 10 | 12 |

Chemical analysis

| MgO | 43.5 % | (9.01) |
|---|---|---|
| Al₂O₃ | 12.2 % | (1.0) |
| SO₃ | 13.4 % | (1.40) |
| H₂O | 32.7 % | (15.13) |

EXAMPLE 52

Into 200 ml of water 24.4 g of MgCl₂.6H₂O were dissolved, 7.5 g of Al(NO₃)₃.9H₂O and 5.4 g of FeCl₃.6H₂O. Separately, a solution of 4.7 g of Na₂CrO₄.4H₂O dissolved in 100 ml of water were dissolved. Both liquors were added dropwise into a four-neck flask charged with 100 ml of water. The pH of the reaction liquor was maintained at 12 – 13 by addition of a NaOH aqueous solution. After completion of the reaction, the resulting suspension was rapidly filtered in a N₂ gas atmosphere and the filtered solid was washed with 200 ml of decarbonated ion-exchange water in a N₂ gas atmosphere and dried at about 60°C. for 10 hours in N₂ gas current. Analysis results of the product are as follows:

Composition formula

Mg₆(AlFe)(OH)₁₆CrO₄.4H₂O    K = 11.5 (Mg-CrO₄ series)
                             x/y = 3
                             z/(x+y) = 1/8

X-ray diffraction

| d(Å) | 7.89 | 3.85 | 2.60 | 1.52 |
|---|---|---|---|---|
| I/I₀ | 100 | 52 | 21 | 10 |

Chemical analysis

| MgO | 35.1 % | (6.00) |
|---|---|---|
| Al₂O₃ | 7.4 % | (0.50) |
| Fe₂O₃ | 11.6 % | (0.50) |
| CrO₄ | 16.8 % | (1.00) |
| H₂O | 31.4 % | (11.92) |

EXAMPLE 53

In 100 ml of a solution of magnesium chloride of a concentration of 1.2 moles/liter calculated as MgO, 3.6 g of FeCl₃.6H₂O, 5.3 g of Cr(NO₃)₃.9H₂O and 5.0 g of Al(NO₃)₃.9H₂O were dissolved, and the pH of the solution was adjusted to 1 by concentrated hydrochloric acid. 100 ml of the so prepared solution acidified by hydrochloric acid were added dropwise at room temperature under agitation to a 500-ml capacity beaker charged with 80 ml of water, together with 25.6 ml of a K₂CrO₄ solution of a concentration of 0.2 mole/liter and a caustic soda solution of a concentration of 2.0 moles/liter. The pH of the reaction liquor was maintained above 13 by adjusting the addition of the caustic soda solution. After completion of the reaction, water was removed from the resulting suspension under reduced pressure, and the remaining solid was washed with water and dried. Results of the analysis of the product are as follows:

Composition formula
$Mg_6Fe_{2/3}Cr_{2/3}Al_{2/3}(OH)_{16}CrO_4 \cdot 4H_2O$
K = 11.5
x/y = 3
z/(x+y) = ⅛

X-ray diffraction

| d(A) | 7.89 | 3.85 | 2.61 | 2.34 | 1.52 |
|---|---|---|---|---|---|
| I/I₀ | 100 | 35 | 13 | 9 | 6 |

Chemical analysis

| MgO | 30.4 % | (6.01) |
|---|---|---|
| Fe₂O₃ | 12.0 % | (0.32) |
| Cr₂O₃ | 11.4 % | (0.33) |
| Al₂O₃ | 7.2 % | (0.32) |
| CrO₄ | 12.6 % | (0.99) |
| H₂O | 26.4 % | (11.71) |

EXAMPLE 54

In 100 ml of a solution of magnesium chloride of a concentration of 1.2 moles/liter calculated as MgO, 3.6 g of FeCl₃·6H₂O, 5.3 g of Cr(NO₃)₃·9H₂O and 5.0 g of Al(NO₃)₃·9H₂O were dissolved, and the pH of the solution was adjusted to 1 by concentrated hydrochloric acid. 100 ml of the so prepared solution acidified by hydrochloric acid were added dropwise at room temperature under agitation to a 500-ml capacity beaker charged with 80 ml of water, together with 25.6 ml of a Na₂CrO₄ solution of a concentration of 0.092 mole/liter, 25.6 ml of a Na₂SO₄ solution of a concentration of 0.092 mole/liter and a caustic soda solution of a concentration of 2.0 moles/liter. The pH of the reaction liquor was maintained above 13 by adjusting the addition of the caustic soda solution. After completion of the reaction, water was removed from the resulting suspension under reduced pressure, and the remaining solid was washed with water and dried. In this Example the reaction and post-treatment were conducted in a N₂ gas atmosphere. Results of the analysis of the product are as follows:

Composition formula
$Mg_6Fe_{2/3}Cr_{2/3}Al_{2/3}(OH)_{16}(OH)_{16}(CrO_4)_{0.5}(SO_4)_{0.5} \cdot 4H_2O$
K = 11.5 (Mg—CrO₄ series)
K = 11.4 (Mg—SO₄ series)
x/y = 3
z/(x+y) = ⅛

X-ray diffraction

| d(A) | 7.96 | 3.97 | 2.64 | 2.35 | 1.53 |
|---|---|---|---|---|---|
| I/I₀ | 100 | 35 | 13 | 9 | 6 |

Chemical analysis

| MgO | 30.8 | (6.0) |
|---|---|---|
| Fe₂O₃ | 12.2 % | (0.33) |
| Cr₂O₃ | 11.6 % | (0.34) |
| Al₂O₃ | 7.3 % | (0.33) |
| CrO₄ | 7.5 % | (0.49) |
| SO₄ | 6.3 % | (0.50) |
| H₂O | 26.7 % | (11.65) |

EXAMPLE 55

5.0 g of dried $Mg_6Al_2(OH)_{16}SO_4 \cdot 4H_2O$ were packed in a burette, the bottom of which was stuffed with glass wool. A solution of 8.84 g of K₂SeO₃ dissolved in 200 ml of water was poured into the burette to effect ion-exchange. The product was taken out, washed with 100 ml of cool water and dried at 70°C. Results of the analysis of the product are as follows:

Composition formula
$Mg_6Al_2(OH)_{16}SeO_3 \cdot 4H_2O$   x/y = 3
z/(x+y) = ⅛

X-ray diffraction

| d(A) | 7.87 | 3.93 | 2.56 | 2.29 | 1.95 | 1.52 | 1.49 |
|---|---|---|---|---|---|---|---|
| I/I₀ | 100 | 30 | 31 | 22 | 18 | 9 | 8 |

Chemical analysis

| MgO | 36.7 % | (6.10) |
|---|---|---|
| Al₂O₃ | 15.2 % | (1.0) |
| SeO₃ | 16.5 % | (1.00) |
| SO₄ | 0.04 % | ( — ) |
| H₂O | 32.5 % | (12.10) |

EXAMPLE 56

10.0 g. of dried $Mg_6Fe_2(OH)_{16}CO_3 \cdot 4H_2O$ were ion-exchanged in the same manner as in Example 55 by using a solution of 5.0 g of Na₂SeO₃·5H₂O dissolved in 200 ml of water. Results of the analysis of the product are as follows:

Composition formula
$Mg_6Fe_2(OH)_{16}SeO_3 \cdot 4H_2O$   x/y = 3
z/(x+y) = ⅛

X-ray diffraction

| d(A) | 7.88 | 3.92 | 2.63 | 2.30 | 1.54 | 1.51 |
|---|---|---|---|---|---|---|
| I/I₀ | 100 | 30 | 13 | 8 | 4 | 4 |

Chemical analysis

| MgO | 33.2 % | (6.01) |
|---|---|---|
| Fe₂O₃ | 21.9 % | (1.0) |
| SeO₃ | 17.4 % | (1.00) |
| H₂O | 29.4 % | (11.90) |

EXAMPLE 57

10.0 g of dried $Mg_6Al_2(OH)_{16}CO_3 \cdot 4H_2O$ were packed in a burette, the bottom of which was stuffed with glass wool. A solution of 7.2 g of Na₂Cr₂O₇·2H₂O dissolved in 200 ml of water was poured into the burette to effect ion-exchange. The product was taken out, washed with 50 ml of cool water and dried at 80°C. Results of the analysis of the product are as follows:

Composition formula
$Mg_6Al_2(OH)_{16}Cr_2O_7 \cdot 4H_2O$   x/y = 3
z/(x+y) = ⅛

X-ray diffraction

| d(A) | 9.96 | 3.98 | 2.60 | 2.32 | 1.97 | 1.54 | 1.51 |
|---|---|---|---|---|---|---|---|
| I/I₀ | 100 | 45 | 42 | 38 | 26 | 18 | 18 |

Chemical analysis

| MgO | 31.8 % | (6.0) |
|---|---|---|
| Al₂O₃ | 13.4 % | (1.0) |
| Cr₂O₇ | 28.4 % | (1.01) |
| H₂O | 28.5 % | (12.02) |

EXAMPLE 58

10.0 g. of dried $Mg_6Al_2(OH)_{16}CO_3 \cdot 4H_2O$ were ion-exchanged in the same manner as in Example 57 by using a solution of 3.0 g of K₂CrO₄ dissolved in 200 ml of water. Results of the analysis of the product are as follows:

Composition formula
$Mg_6Al_2(OH)_{16}CrO_4 \cdot 4H_2O$   x/y = 3
z/(x+y) = ⅛

X-ray diffraction

| d(A) | 7.62 | 3.81 | 2.60 | 2.33 | 1.53 | 1.54 |
|---|---|---|---|---|---|---|
| I/I₀ | 100 | 43 | 30 | /22 | 9 | 6 |

Chemical analysis

| MgO | 36.6 % | (6.01) |
|---|---|---|
| Al₂O₃ | 5.4 % | (1.0) |
| CrO₄ | 17.6 % | (0.99) |

-Continued

| Composition formula | | |
|---|---|---|
| $H_2O$ | 32.7 % | (11.97) |
| $CO_2$ | 0.1 % | ( — ) |

What we claim is:

1. A composite metal hydroxide expressed by the following composition formula:

$$Mg_{0.5-16}M_2^{3+}(OH)_{7-2z \sim 38-2z}(A^{2-})_z \cdot 0.625 \text{ } 18 H_2O$$

wherein $M^{3+}$ is a trivalent metal selected from the group consisting of aluminum, iron and chromium; $A^{2-}$ represents a divalent anion selected from the group consisting of $S^=$, $Pt(CN)_4^=$, $CS_3^=$, $CrO_4^=$, $Cr_2O_7^=$, $B_4O_7^=$, $MoO_4^=$, $SeO_3^=$, $SeO_4^=$, $SiO_3^=$, $HPO_4^=$, $NH_4PO_4^=$, $SiF_6^=$ and $S_2O_3^=$; and z is a positive number falling within the range:

$$1/6 > \frac{z}{2.5 \sim 18} > 1/20,$$

said composite metal hydroxide having a layer crystal structure expressed substantially by the following X-ray diffraction pattern:

| $d$ (A) | Relative Intensity ($I/I_o$) |
|---|---|
| 7.8 ±3.2 | 100 |
| 3.9 ±1.6 | 5 – 80 |
| 2.6 ±1.2 | 5 – 60 |
| 1.54 ±0.05 | 2 – 10 |
| 1.51 ±0.05 | 2 – 10 | and exhibiting an endothermic peak owing to isolation of crystal water at a temperature exceeding 170°C. in the differential thermal analysis.

2. The composite metal hydroxide of claim 1, which has a composition expressed by the following formula:

$$Mg_{2-16}M_2^{3+}(OH)_{7.5-34}A^{2-}_{0.5-2.5} \cdot 1.5-6H_2O$$

wherein $M^{3+}$ is selected from iron, aluminum and chromium, and $A^{2-}$ is selected from $CrO_4^=$, $Cr_2O_7^=$, $MoO_4^=$, $SiO_3^=$, $SeO_4^=$ and $B_4O_7^=$.

* * * * *

UNITED STATES PATENT OFFICE
CERTIFICATE OF CORRECTION

Patent No. 3,879,525    Dated April 22, 1975

Inventor(s) MIYATA, ET AL.

It is certified that error appears in the above-identified patent and that said Letters Patent are hereby corrected as shown below:

Claim 1, line 4, after "0.625" insert -- ～ --

Claim 1, line 8, delete "$Pt(CN_4^=$", insert -- $Pt(CN)_4^=$ --

Signed and Sealed this nineteenth Day of August 1975

[SEAL]

Attest:

RUTH C. MASON  
Attesting Officer

C. MARSHALL DANN  
Commissioner of Patents and Trademarks